(12) United States Patent
Satpathy et al.

(10) Patent No.: US 11,121,856 B2
(45) Date of Patent: Sep. 14, 2021

(54) UNIFIED AES-SMS4—CAMELLIA SYMMETRIC KEY BLOCK CIPHER ACCELERATION

(71) Applicant: Intel Corporation, Santa Clara, CA (US)

(72) Inventors: Sudhir Satpathy, Hillsboro, OR (US); Vikram Suresh, Portland, OR (US); Sanu Mathew, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 134 days.

(21) Appl. No.: 16/010,206

(22) Filed: Jun. 15, 2018

(65) Prior Publication Data

US 2019/0386815 A1    Dec. 19, 2019

(51) Int. Cl.
*H04L 9/06* (2006.01)
*G09C 1/00* (2006.01)
*G06F 7/72* (2006.01)

(52) U.S. Cl.
CPC ............ *H04L 9/0631* (2013.01); *G06F 7/724* (2013.01); *G09C 1/00* (2013.01); *H04L 9/0637* (2013.01)

(58) Field of Classification Search
CPC .... G06F 7/00; G06F 7/724; G06F 2207/7209; H04L 9/0637; H04L 9/0631; G09C 1/00
See application file for complete search history.

(56) References Cited

U.S. PATENT DOCUMENTS 7,257,718 B2 * 8/2007 Lundvall ............. G06F 9/30094
                                                    713/193
8,155,308 B1 * 4/2012 Poo ....................... H04L 9/0631
                                                    380/29
2008/0240422 A1 * 10/2008 Ozturk ................. H04L 9/0631
                                                    380/28
2010/0208885 A1 * 8/2010 Murphy ................. H04L 9/003
                                                    380/28
2010/0246815 A1 * 9/2010 Olson ...................... G06F 7/483
                                                    380/29

(Continued)

OTHER PUBLICATIONS

Rei Ueno , "Highly Efficient GF(2A8) Inversion Circuit Based on Redundant GF Arithmetic and Its Application to \ES Design", Sep. 2015, pp. 63-80.*

*Primary Examiner* — Mohammad A Siddiqi
(74) *Attorney, Agent, or Firm* — Nicholson De Vos Webster & Elliott LLP

(57) ABSTRACT

Disclosed embodiments relate to a unified Advanced Encryption Standard (AES), SMS4, and *Camellia* (CML) accelerator. In one example, a processor includes fetch circuitry to fetch a cipher instruction specifying an opcode, a datum, and a key, the opcode to specify one of three cryptographic modes and an operation, decode circuitry to decode the fetched cipher instruction, and execution circuitry to respond to the decoded cipher instruction by performing the operation using a selected one of three block ciphers corresponding to the specified cryptographic mode and a unified cipher datapath shared by the three block ciphers, the unified cipher datapath comprising a plurality of hybrid substitution boxes (Sboxes) to perform Galois Field (GF) multiplications and inverse computations, wherein the unified cipher datapath is to implement an eighth-order polynomial isomorphically equivalent to each polynomial used by the three block ciphers by calculating and then combining two fourth-order polynomials.

25 Claims, 25 Drawing Sheets

(56) References Cited

U.S. PATENT DOCUMENTS

| | | | | |
|---|---|---|---|---|
| 2012/0311348 A1* | 12/2012 | Osugi | ............ | G06F 21/572 713/189 |
| 2015/0341168 A1* | 11/2015 | Gueron | ............ | H04L 9/0838 380/28 |
| 2016/0026468 A1* | 1/2016 | Gueron | ............ | H04L 9/0631 713/190 |
| 2019/0044699 A1* | 2/2019 | Satpathy | ............ | H04L 9/0631 |

* cited by examiner

|     | SMS4 | | AES | | CML | |
| --- | --- | --- | --- | --- | --- | --- |
| CLK | $S_{7:4}$ | $S_{3:0}$ | $S_{7:4}$ | $S_{3:0}$ | $S_{7:4}$ | $S_{3:0}$ |
| 0 | Round | Key | Round | Round | Key | Key |
| 1 | Round | Key | Round | Key | Key | Key |
| 2 | Round | Key | Round | Key | Key | Key |
| 3 | Round | Key | Round | Round | Key | Key |
| 4 | Round | Key | Round | Round | Round | Round |
| | | | | | | |
| | 1 clock/round | | 2.5 clock/round | | 1.3 clock/round | |

FIG. 3

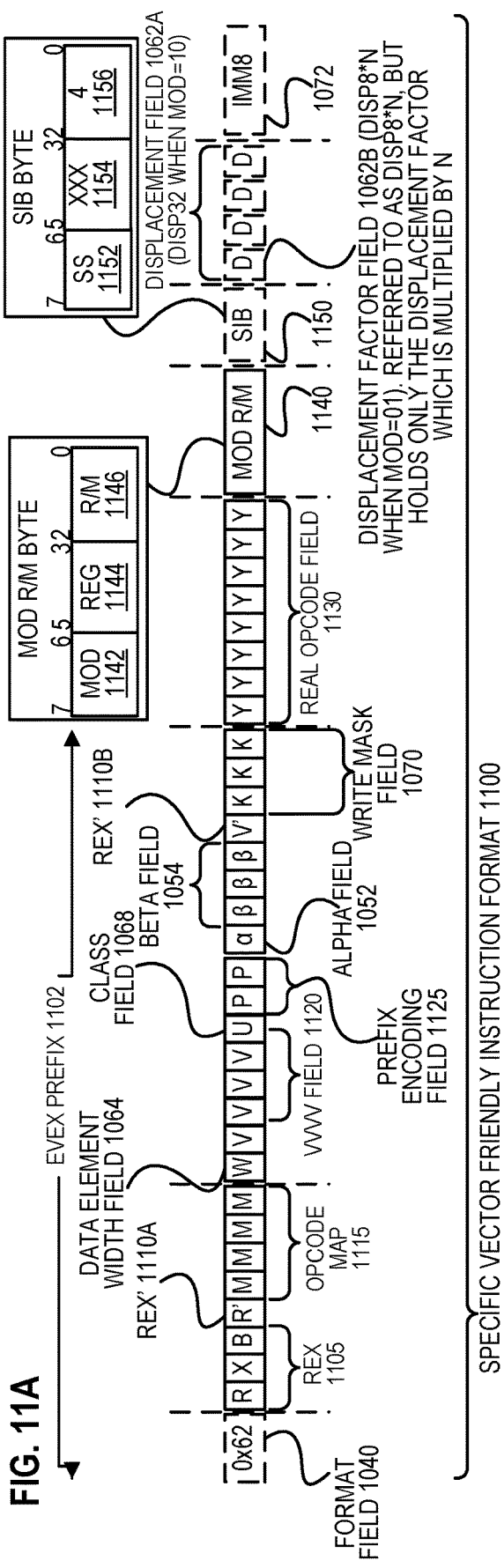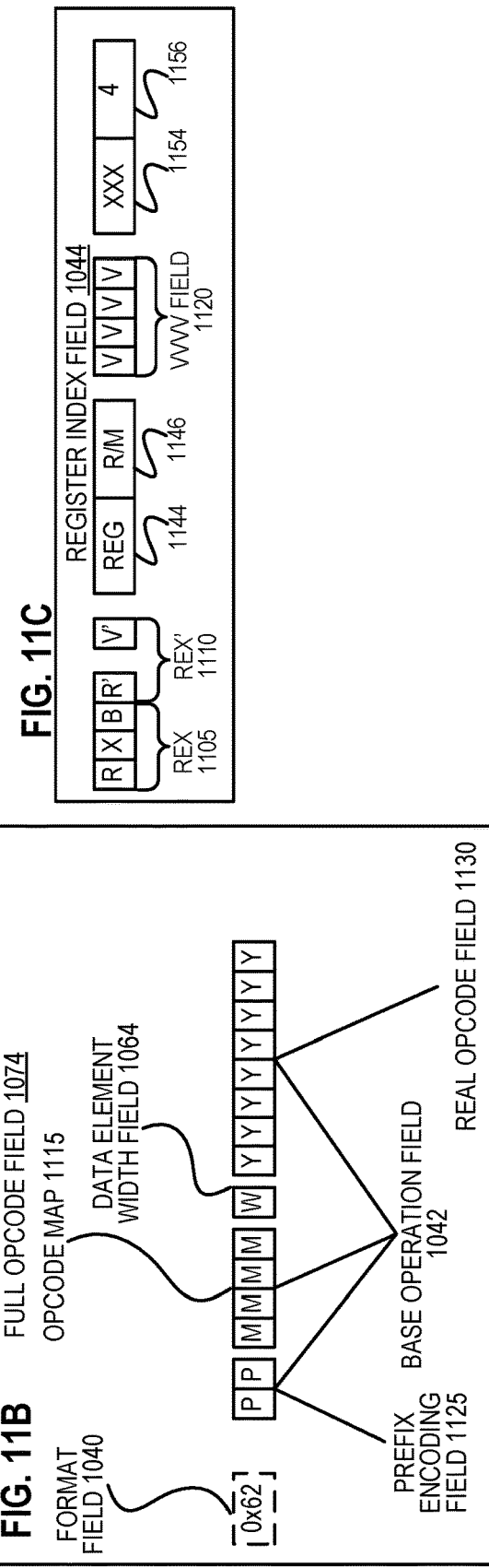

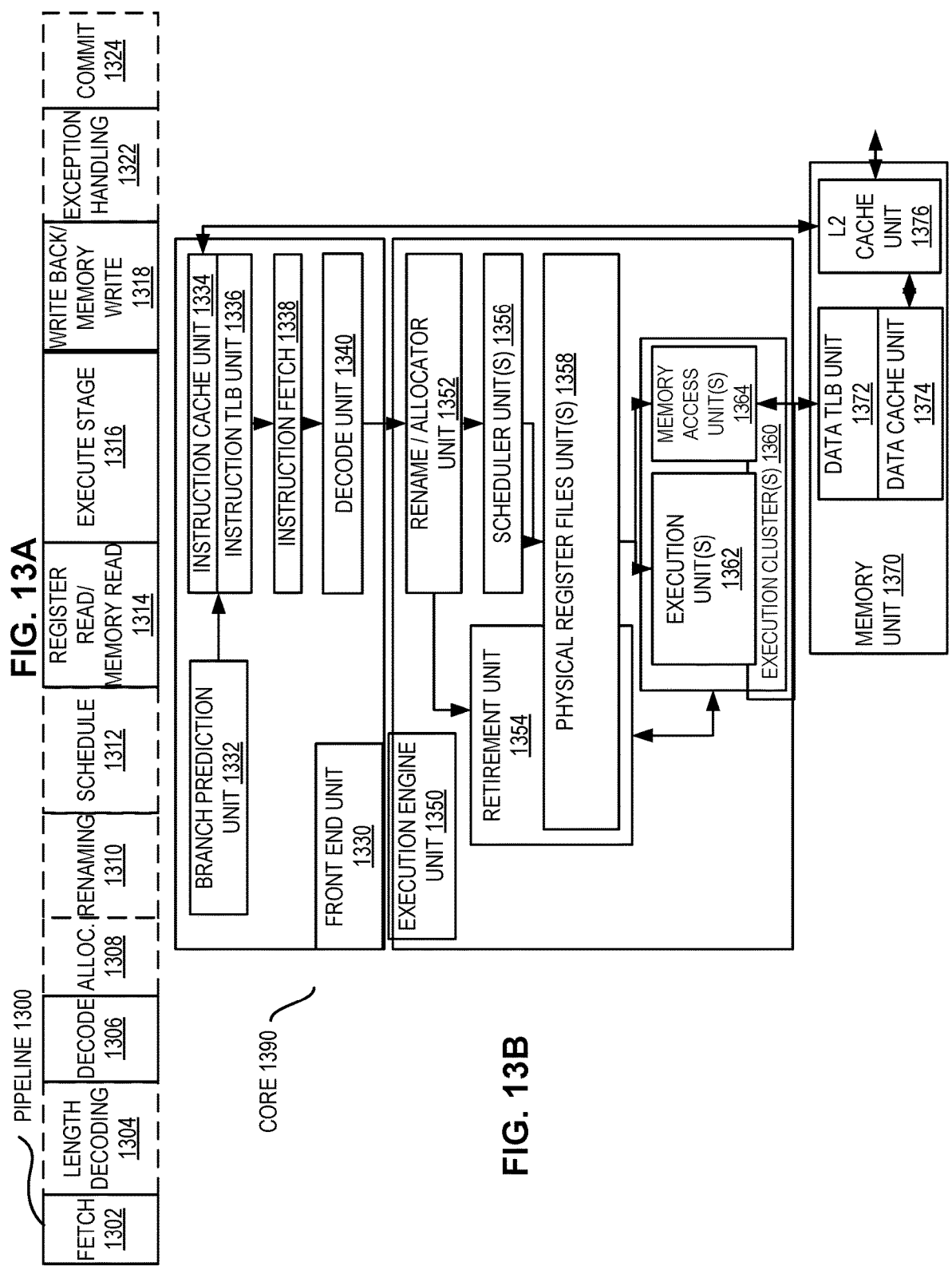

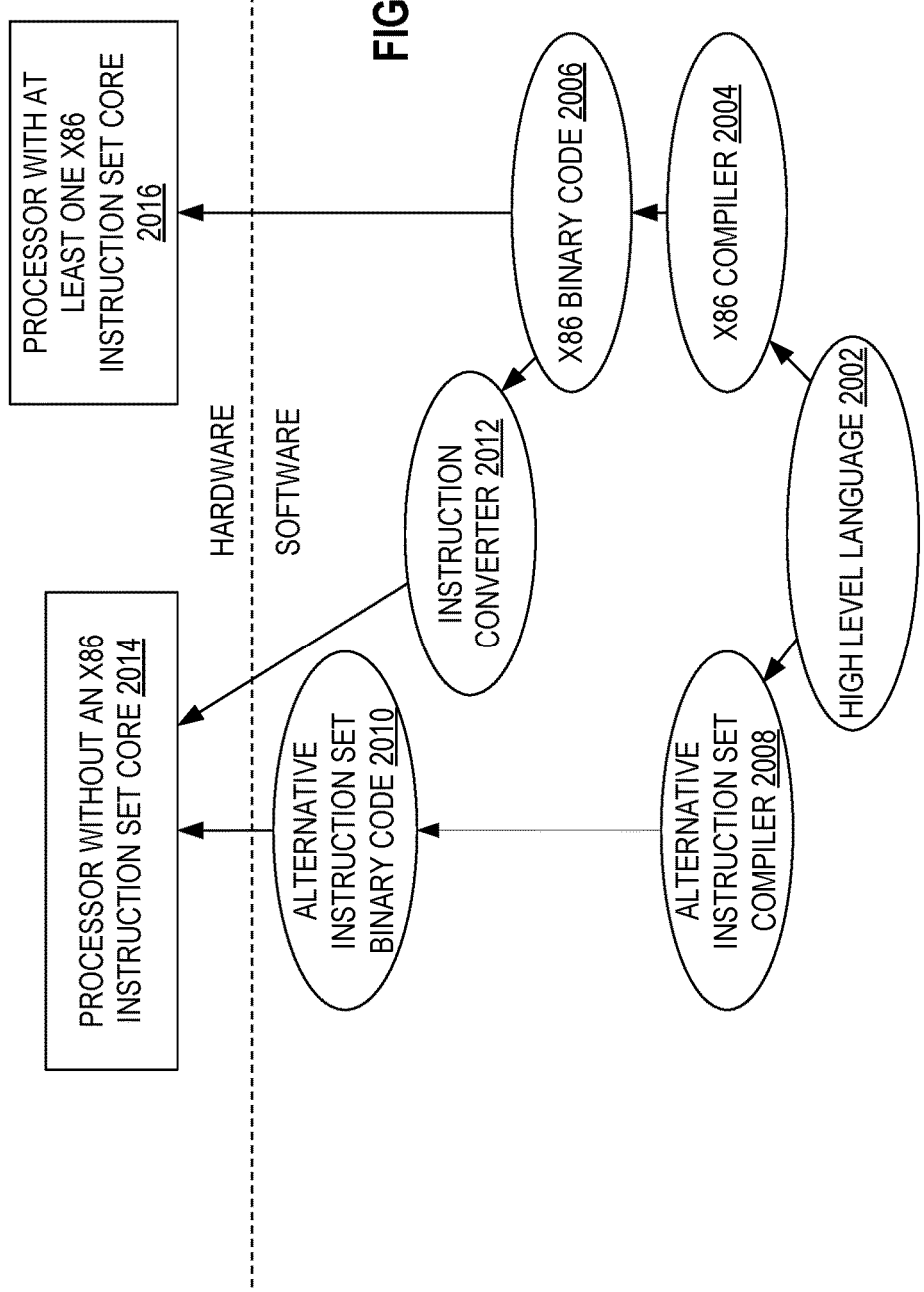

UNIFIED AES-SMS4—CAMELLIA SYMMETRIC KEY BLOCK CIPHER ACCELERATION

FIELD OF THE INVENTION

The field of invention relates generally to computer processor architecture, and, more specifically, to a unified Advanced Encryption Standard (AES), SMS4, and *Camellia* (CML) accelerator.

BACKGROUND

Symmetric key block ciphers constitute a critical component of all content protection, authentication and key management protocols. Although AES (Advanced Encryption Standard) is a standardized and often de facto standard for most security applications, equivalent geo-specific ciphers like standardized SMS4 (China) and standardized *Camellia* (Japan) are increasingly used in IPsec, WAPI, TLS, etc. following OSCCA, ISO/IEC, and NESSIE recommendations, and mandates for usage in different geos.

AES is a symmetric key block cipher encryption standard adopted by the U.S. government starting in 2001. It is widely used across the software ecosystem to protect network traffic, personal data, and corporate IT infrastructure.

SMS4 (now SM4) is a symmetric key block cipher used in the Chinese National Standard for Wireless LAN WAPI (Wired Authentication and Privacy Infrastructure). SMS4 was a proposed cipher to be used in I8 802.11i standard but has so far been rejected by the ISO.

*Camellia* (CML) is a symmetric key block cipher approved for use by the ISO/IEC, the European Union's NESSIE project and the Japanese CRYPTREC project. *Camellia* is part of the Transport Layer Security (TLS) cryptographic protocol designed to provide communications security over a computer network such as the Internet.

AES, SMS4 and CML encrypt 128b data with 128b secret key with 10/32/18 rounds of computation, wherein each round involves a different substitute box (Sbox), as well as rotate, scaling, and mixing steps necessitating separate hardware implementations or firmware code.

BRIEF DESCRIPTION OF THE DRAWINGS

The present invention is illustrated by way of example and not limitation in the figures of the accompanying drawings, in which like references indicate similar elements and in which:

FIG. 3 illustrates round compute and key expansion timing of AES/SMS/CML flows, according to some embodiments;

FIG. 10A is a block diagram illustrating a generic vector friendly instruction format and class A instruction templates thereof according to some embodiments of the invention;

FIG. 10B is a block diagram illustrating the generic vector friendly instruction format and class B instruction templates thereof according to some embodiments of the invention;

FIG. 11A is a block diagram illustrating an exemplary specific vector friendly instruction format according to some embodiments of the invention;

FIG. 11B is a block diagram illustrating the fields of the specific vector friendly instruction format that make up the full opcode field according to one embodiment;

FIG. 11C is a block diagram illustrating the fields of the specific vector friendly instruction format that make up the register index field according to one embodiment;

FIG. 13A is a block diagram illustrating an exemplary in-order pipeline, an exemplary register renaming, and out-of-order issue/execution pipeline according to some embodiments;

FIG. 13B is a block diagram illustrating both an exemplary embodiment of an in-order architecture core and an exemplary register renaming, out-of-order issue/execution architecture core to be included in a processor according to some embodiments;

FIG. 14A is a block diagram of a single processor core, along with its connection to the on-die interconnect network and with its local subset of the Level 2 (L2) cache, according to some embodiments;

FIG. 14B is an expanded view of part of the processor core in FIG. 14A according to some embodiments;

FIG. 16 shown a block diagram of a system in accordance with some embodiments;

FIG. 17 is a block diagram of a first more specific exemplary system in accordance with some embodiment;

FIG. 18 is a block diagram of a second more specific exemplary system in accordance with some embodiments;

FIG. 19 is a block diagram of a System-on-a-Chip (SoC) in accordance with some embodiments; and FIG. 20 is a block diagram contrasting the use of a software instruction converter to convert binary instructions in a source instruction set to binary instructions in a target instruction set according to some embodiments.

DETAILED DESCRIPTION OF THE EMBODIMENTS

Figure 1:
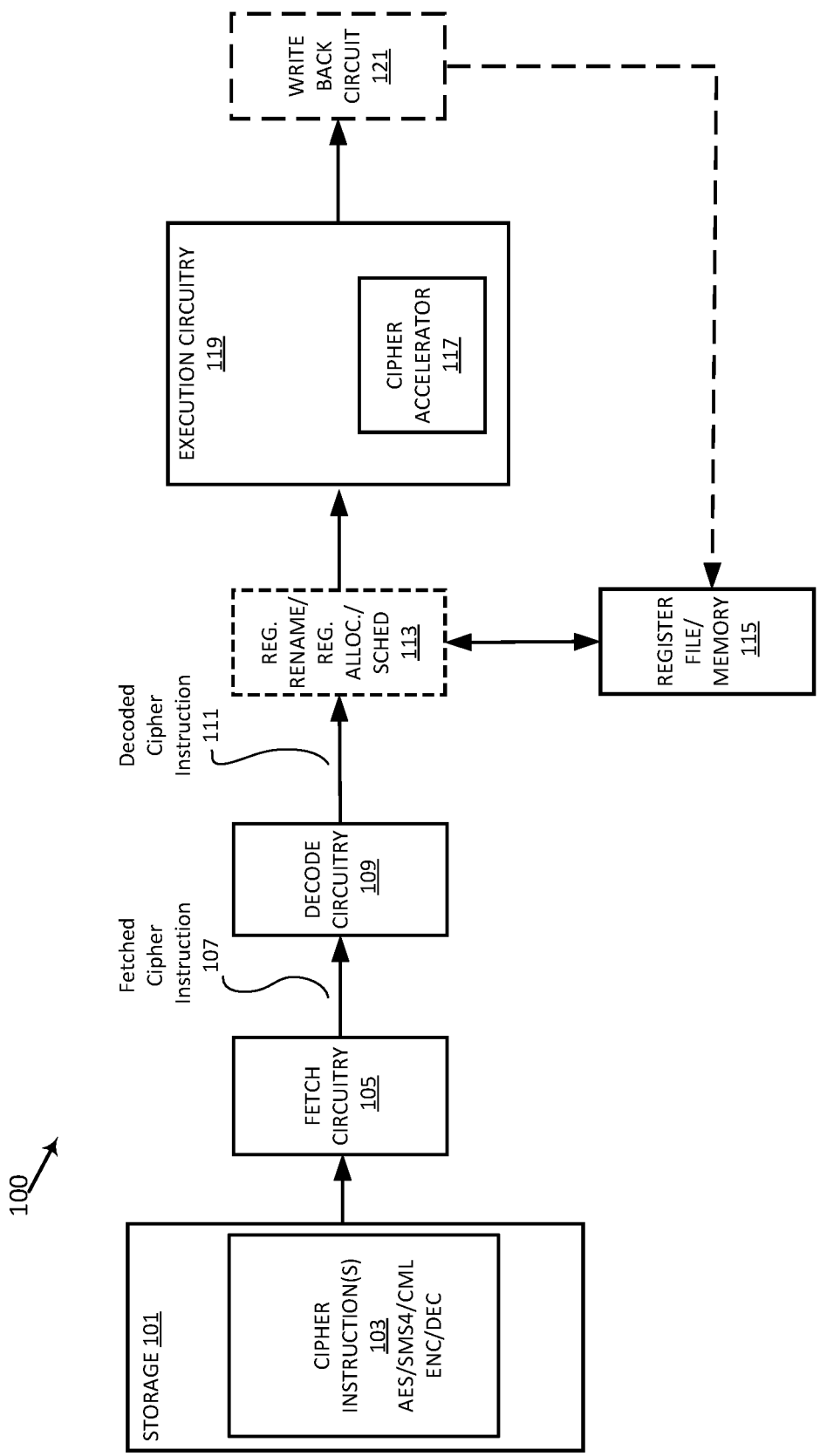
FIG. 1 is a block diagram illustrating processing components for executing a cipher instruction, according to an embodiment.

In the following description, numerous specific details are set forth. However, it is understood that some embodiments may be practiced without these specific details. In other instances, well-known circuits, structures and techniques have not been shown in detail in order not to obscure the understanding of this description.

References in the specification to "one embodiment," "an embodiment," "an example embodiment," etc., indicate that the embodiment described may include a feature, structure, or characteristic, but every embodiment may not necessarily include the feature, structure, or characteristic. Moreover, such phrases are not necessarily referring to the same embodiment. Further, when a feature, structure, or characteristic is described about an embodiment, it is submitted that it is within the knowledge of one skilled in the art to affect such feature, structure, or characteristic about other embodiments if explicitly described.

Disclosed embodiments describe a unified engine that leverages polynomial isomorphism to accelerate AES (Advanced Encryption Standard), SMS4, and *Camellia* (CML) in a common optimal $GF(2^4)^2$ datapath with in-line key expansion. Disclosed embodiments avoid using lookup tables, which can add cost and area. The disclosed unified AES/SMS4/CML encrypt/decrypt hardware accelerator is expected to provide a significant area improvement over using separate AES/SMS4/CML datapath implementations.

Although AES, SMS4, and CML ciphers may perform similar substitution box (Sbox) operations, they use different Galois field (GF) $GF(2^8)$ reduction polynomials.

A substitution box (Sbox) is a basic component of symmetric key algorithms which performs substitution. In general, an Sbox may take some number of input bits, m, and transform them into some number of output bits, n, where n is not necessarily equal to m. In mathematics, the finite field with pn elements is denoted GF(pn) and is called the Galois Field (where p is a prime number). The Galois Field is sometimes referred to herein as the unified field or the unified Galois Field.

AES may use the $GF(2^8)$ reduction polynomial $x^8+x^4+x^3+x+1$, while SMS4 may use the $GF(2^8)$ reduction polynomial $x^8+x^7+x^6+x^5+x^4+x^2+1$, and CML may use $X^2+x+1$, $x^2+x+9$. The choice of reduction polynomial differentiates the logic for Galois Field multiplications and inverse computations, thus requiring the use of separate circuits for AES and SMS4 hardware implementations. Implementing separate dedicated hardware accelerators for AES and SMS4 is clumsy and inefficient and may result in significant area and power overhead.

The embodiments described herein reduce circuit area by avoiding separate hardware for each of AES, SMS, and CML. Instead, disclosed embodiments address AES/SMS/CML encryption and decryption using a single hybrid hardware accelerator that can be reconfigured to support AES, SMS4, or CML encryption and/or decryption. AES, SMS4, and CML ciphers consist of three main components: (1) the addition of a round key to intermediate round data; (2) substitute box (Sbox) operations; and (3) mixing at byte boundaries using XOR or mixed column operations. Of these, the Sbox may include the most area and performance critical operations.

In one embodiment, a 128-bit encrypt/decrypt datapath configured for AES includes 8 Sbox modules to be used for rounding computation and key expansion at a rate of 2.5 clock cycles per round. In other embodiments, the 128-bit encrypt/decrypt datapath can be configured for SMS4, in which case four of the 8 Sbox modules are used for round computation and the other four of the 8 Sbox modules are used for key expansion, to achieve an overall rate of one round per cycle. As to CML, round computation and key expansion each require 8 Sboxes, so an auxiliary key is computed in the initial 4 cycles, followed by 20 cycles of round computation, yielding a throughput of 20 rounds over 25 cycles, or 1.2 clock cycles per round, for 24 cycles.

The hybrid encrypt/decrypt hardware accelerator described herein may result in significant area improvement over separate AES/SMS4 datapath implementations. The area savings may be achieved by using common Galois field inversion circuits, which are expected to require much less circuit area than separate AES/SMS4 Sbox implementations. To avoid the need to have separate implementations, disclosed embodiments select ground and extension field polynomials that work for AES, SMS4, and CML computations. The hybrid AES-SMS4-CML hardware accelerator described herein may be implemented in any logic device, including, but not limited to, a processor, a processor core, a network processor, a mobile processor, a field-programmable gate array (FPGA) and a web server.

Disclosed embodiments include several aspects, features, and advantages, as described and illustrated at least with respect to FIGS. 1-8, including, but not limited to:

Cost and energy efficiency is improved by using a shared unified AES-SMS4-CML datapath with in-line key expansion organized around 8 Sboxes 100% for AES and SMS4, and 92% for *Camellia*. *Camellia* encryption involves 18 cycles of round processing plus 4 cycles of key expansion, all of which use 100% of Sboxes. However, the *Camellia* cipher block performs 2 special operations after round 6 and round 12, for which 2 extra cycles are spent. These 2 special operations do not use Sboxes, so CML utilization is 92%, corresponding to Sboxes being used in 22 of the 24 cycles.

In addition to Sbox optimization, other compute intensive operations like AES mix-columns is implemented with multiply-less circuits to match critical path delay across all cipher modes for higher performance.

A 2.5 cycle/AES-round architecture leverages the presence of *Camellia*'s auxiliary key register to hold precomputed subsequent round keys and to thus eliminate stalls between successive rounds.

AES, SMS4 and *Camellia* require a different number of Sboxes at various stages of round compute and key expansion. Embodiments disclosed herein are expected to optimize the area efficiency of implementation for accelerating AES, SMS4, *Camellia* ciphers, and, instead of implementing block ciphers with separate cipher accelerators, sharing a single, unified accelerator among the multiple block ciphers, thereby saving area.

FIG. 1 is a block diagram illustrating processing components for executing a cipher instruction, according to some embodiments. As illustrated, storage 101 stores cipher instruction(s) 103 to be executed. As described further below, in some embodiments, computing system 100 is an SIMD processor to concurrently process multiple elements of packed-data vectors.

In operation, the cipher instruction(s) 103 is fetched from storage 101 by fetch circuitry 105. The fetched cipher instruction 107 is decoded by decode circuitry 109. The cipher instruction format, which is further illustrated and described with respect to FIGS. 9, 10A-B, and 11A-D, has fields (not shown here) is to specify an opcode, a cryptographic mode, an operation, a datum, and a key. The opcode is to describe which block cipher mode to apply, and whether to encrypt or decrypt. Decode circuitry 109 decodes the fetched cipher instruction 107 into one or more operations. In some embodiments, this decoding includes generating a plurality of micro-operations to be performed by execution circuitry (such as execution circuitry 119). The decode circuitry 109 also decodes instruction suffixes and prefixes (if used).

In some embodiments, register renaming, register allocation, and/or scheduling circuit 113 provides functionality for one or more of: 1) renaming logical operand values to physical operand values (e.g., a register alias table in some embodiments), 2) allocating status bits and flags to the decoded instruction, and 3) scheduling the decoded cipher instruction 111 for execution on execution circuitry 119 out of an instruction pool (e.g., using a reservation station in some embodiments). Register renaming, register allocation, and/or scheduling circuit 113 is optional, as indicated by its dashed border, insofar as it may occur at a different time in the pipeline, or not at all.

Computing system 100 also includes cipher accelerator 117, which is to perform encryption and decryption according to an Advanced Encryption Standard (AES), SMS4, or *Camellia* (CML), depending on which mode is selected by the opcode. Cipher accelerator 117 is illustrated as being incorporated in execution circuitry 119, but in some embodiments, the cipher accelerator 117 is external to the execution circuitry. Cipher accelerator 117 is further illustrated and described below with respect to FIGS. 2A-8.

Execution circuitry 119 is to perform the decoded instruction. When the opcode of the decoded instruction calls for a block cipher to be performed according to one of the modes disclosed herein, execution circuitry 119 configures the cipher accelerator 117 to perform the cryptograph, be it encoding or decoding. In some embodiments, as further described and illustrated with respect to FIG. 8, cipher accelerator 117 performs one round (default value), or multiple rounds (as specified by an instruction operand) of the specified algorithm. Execution circuitry 119 is further described and illustrated below, at least with respect to FIGS. 2A-8, 13A-B and 14A-B.

Registers (register file) and/or memory 115 store data as operands of decoded cipher instruction 111 to be operated on by execution circuitry 119. Exemplary register types include writemask registers, packed data registers, general purpose registers, and floating point registers, as further described and illustrated below, at least with respect to FIG. 12.

In some embodiments, write back circuit 121 commits the result of the execution of the decoded cipher instruction 111. Execution circuitry 119 and system 100 are further illustrated and described with respect to FIGS. 2A-8, 13A-B, 14A-B, and 15-19.

Figure 2A:
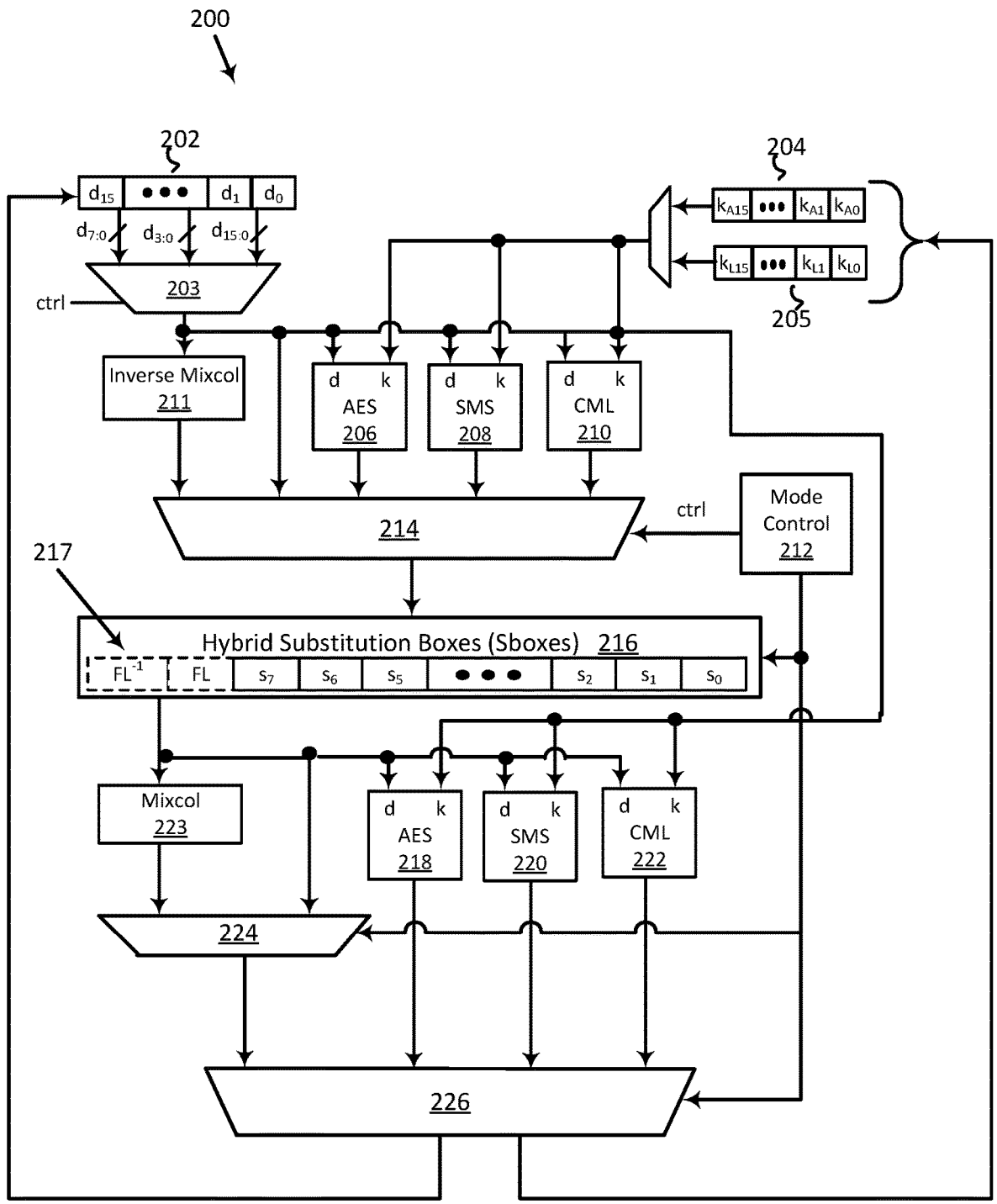
FIG. 2A illustrates is a block diagram illustrating a cipher accelerator, according to some embodiments.

FIG. 2A is a block diagram illustrating a cipher accelerator, according to some embodiments. Cipher accelerator 200 supports AES/SMS4/CML round compute and key expansion, which require 16/4/8 and 4/4/8 Sboxes, respectively.

As shown, cipher accelerator 200 includes 128-bit plain/cipher text register 202, two, key registers 204 and 205 (the latter intended for use by CML, but taken advantage of by AES, as described below), cipher constant generator units 206, 208, and 210, Inverse mix column unit 211 (for use by AES), multiplexer 214 to select input data to Sboxes 216 (which may include FL and FL-1 functions for use by *Camellia*), mode control unit 212 to generate control signals for multiplexer 214, additional operation units 218, 220, and 222 for use by AES, SMS4, and *Camellia*, and mixed columns unit 223 for use by AES. Cipher accelerator 200 further includes multiplexers 224 and 226 to select datapath output to be written either into the input data registers 202 or key registers 204 and 205.

Cipher accelerator 200, as illustrated, improves processor cipher throughput and Sbox efficiency. Bing organized around 8 hybrid Sboxes 216 (and two additional FL and FL-1 functions for use by *Camellia*), cipher accelerator 200 maximizes Sbox utilization, achieving 100% utilization in AES and SMS4 modes, and 92% utilization in CM mode, as described above.

In operation, cipher accelerator 200, operating in one of three modes, AES, SMS4, and CML, consumes 128-bit plain/cipher text 202 (d15:0) (consumes plain text when encrypting/consumes cipher text when decrypting) and key (KL15:0) from two 128b registers, 202 and 204, and returns processed data in shift-row/permute-word/permute-DWord order in AES/SMS4/CML modes, respectively.

When operating in CML mode, the CML block cipher running the CML algorithm requires simultaneous access to the base key stored in base key register 204 and the expanded key stored in an additional auxiliary register (KA15:0) 205 (register 205 is opportunistically used for AES key pre-compute to store a key for use in a subsequent clock cycle (explained later in more detail)).

In operation, operand conversion and all $GF(2^4)^2$ computations are confined to within the Sbox and mix-columns/inv. mix-columns units. This eliminates the need for any mapping logic in key expansion datapath, since data is always returned to the pipeline register in its respective native $GF(2^8)$ domain. This approach also simplifies round constant generation circuit that can be implemented using simple 1b rotate and 8b adder circuits.

Figure 2B:
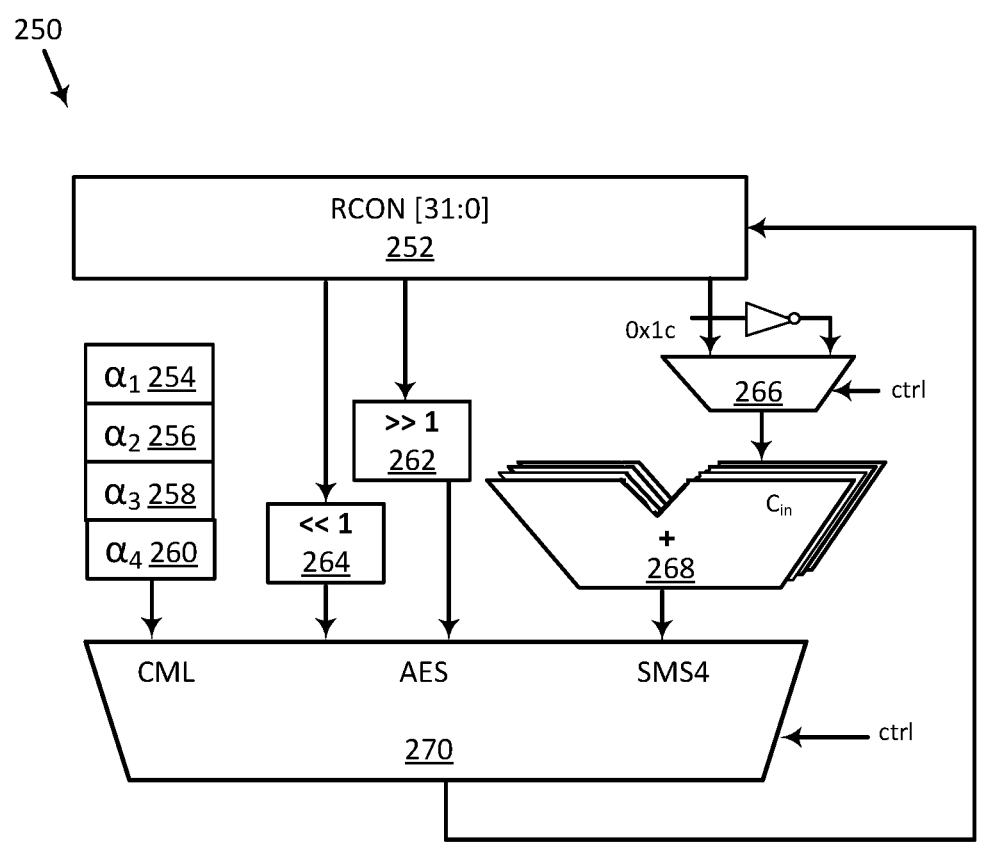
FIG. 2B illustrates is a block diagram illustrating a unified round constant generator circuit, according to some embodiments.

FIG. 2B illustrates is a unified round constant generator circuit, according to some embodiments. As shown, unified round constant generator circuit 250 includes 32-bit constant 252, seed registers $\alpha_1$-$\alpha_4$ 254, 256, 258, and 260, 1-bit rotators 262 and 264, multiplexer 266, and four 8-bit adders 268 to generate 32-bit result 270 in one of CML, AES, or SMS4 modes. The disclosed embodiments and claims herein are not intended to be limited to any particular constant generator circuit; multiple different such circuits can be used with disclosed embodiments, without limitation.

FIG. 3 illustrates round compute and key expansion timing of AES/SMS/CML flows, according to some embodiments. In operation, the cipher accelerator 200 completes 10 AES encryption rounds with interleaved key expansion in 25 cycles. In SMS4 mode, the 32 SMS4 rounds are computed concurrently with key expansion resulting in 32 cycle latency.

In CML mode, auxiliary key computation spans initial 4 cycles followed by 20 cycles of round compute for 24 cycle latency As shown, in CML mode, the first four clock cycles (cycle 0 to 3) are used for key expansion. Subsequently, cycle 4 to 23 (with cycles 5-23 not shown) are used to compute rounds. Although the *Camellia* standard specifies 18 rounds, disclosed embodiment process *Camellia* in 20 cycles because there is a special FL and FL-1 function after round 6 and round 12 which require 2 extra cycles. So, in CML mode, disclosed embodiments spend four clock cycles for key expansion, two clock cycles for the special FL and FL-1 function, and 18 cycles for round computation. Since disclosed embodiments process 18 rounds in 24 cycles, the CML throughput is approximately 1.3 cycles per round.

In some embodiments, the cipher accelerator 200, when operating in CML mode, is to separate the two intra-Feistel CML shuffle functions 217 (FL/FL-1) from regular Sbox operation, which improves critical-path delay.

AES Optimization (Borrowing from CML Resources)

AES key expansion requires only 4 out of 8 Sboxes. Hence, explicitly computing next round key in a clock cycle would result in 50% Sbox utilization. In some embodiments, instead of restricting round and key computation to separate cycles, the cipher accelerator expands keys for the next 2 rounds concurrently with cipher processing. As shown, for example, the AES flow rounds based on 16 bytes, and generates key expansion based on 8 bytes, during clocks 0-2. The keys generated based on those eight bytes are to serve as keys in both the current round and the next round. The 128b data is processed in 2 cycles in 64b chunks by making use of key that was pre-computed in the previous round. CML auxiliary register stores the extra pre-computed key enabling 2.5 cycle/AES round and 100% Sbox utilization.

Polynomial Optimization

Figure 4A:
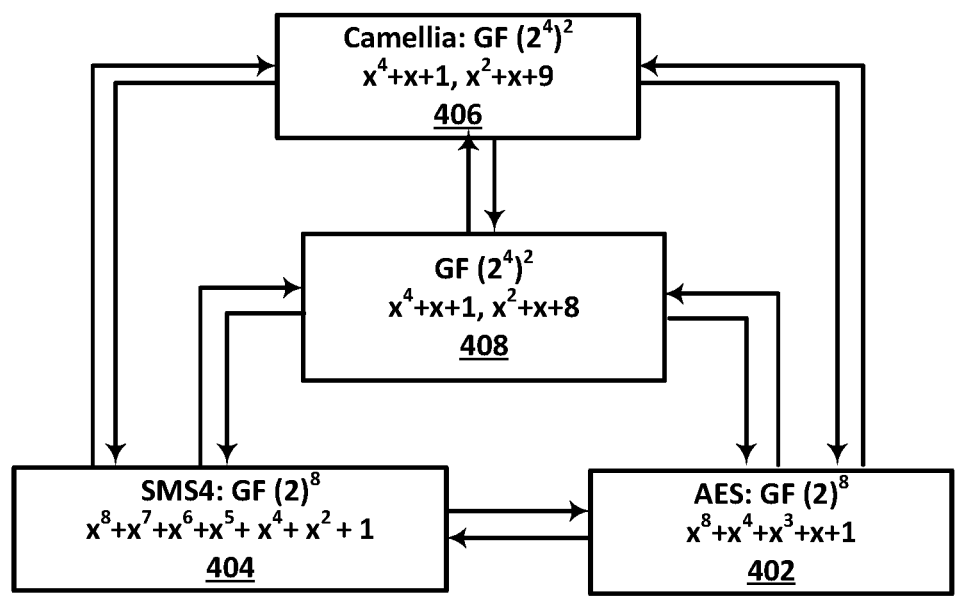
FIG. 4A illustrates optimal reduction polynomials for an AES-SMS4-*Camellia* Hybrid Sbox, according to some embodiments.

FIG. 4A illustrates optimal reduction polynomials for an AES-SMS4-*Camellia* Hybrid Sbox, according to some embodiments. AES and SMS4 standards are defined in GF $(2^8)$ by AES GF $(2)^8$ polynomial $x^8+x^4+x^3+x+1$, labeled as 402, and SMS4 GF $(2)^8$ polynomial $x^8+x^7+x^6+x^5+x^4+x^2+1$, labeled as 404. The CML polynomial is defined as *Camellia* GF$(2^4)^2$ polynomial $x^4+x+1$, $x^2+x+9$, labeled as 406 (The comma means 8 bit data is represented in a new format of two 4 bit quantities, which simplifies and reduces the cost and area of the required circuitry because two 4 bit calculations are performed and later combined to form an 80 bit result, rather than to calculate the result in 8-bit format. In operation, the unified cipher datapath is to calculate an eighth-order polynomial isomorphically equivalent to each polynomial used by the three block ciphers, the eighth-order polynomial being implemented by calculating. As a cost-reducing optimization, the eighth-order polynomial is implanted by calculating and then combining two fourth-order polynomials. In some embodiments the conversion from 4-bit values to an 8-bit result occurs statically.

Figure 4B:
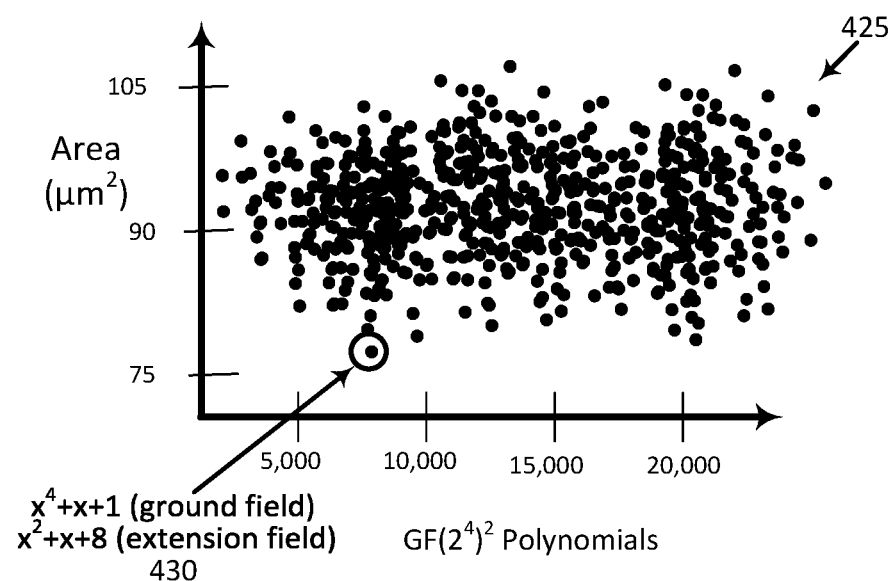
FIG. 4B is a graph illustrating simulated circuit area for various hybrid substitution box (Sbox) polynomial/root combinations, according to some embodiments.

Every choice of the unified field results in unique datapath hardware implementation. A two-step optimization approach exhaustively evaluates the isomorphic space, using a parameterized register transfer level (RTL) model of the hardware implementation that provides an estimate of the circuit area for implementing the chosen polynomials of the hybrid Sbox and mapped affine transforms (FIG. 4B). The first step evaluates 23,040 designs for an AES-SMS4 Sbox, yielding $x^4+x+1$, $x^2+x+8$ for optimal mapping providing 1.8× area savings. The second step evaluates 128 possible ways to translate CML to this optimal field through AES and SMS4 polynomials. Though this optimization concept has been explained in the context of minimizing area, it can also be applied to select the Sbox to maximize performance.

FIG. 4B is a graph illustrating simulated circuit area for various hybrid substitution box (Sbox) polynomial/root combinations, according to some embodiments. The mapping matrix for conversion from GF$(2^8)$ to GF$(2^4)^2$ and vice versa may be obtained by representing the root Δ of a reduction polynomial f(x) in terms of the roots of a ground-field polynomial g(x) and extension-field polynomial p(x). In one embodiment, the ground-field polynomial and the extension-field polynomial are optimized to be common computations by the Sbox for the first, second, and third block ciphers 402, 404, and 406 in the composite field GF$(2^4)^2$.

Graph 425 shows the area spread for polynomial exploration across tens of thousands of combinations representing the AES-SMS4-CML isomorphic space, According to some embodiments, the AES-SMS4-CML is exhaustively searched to identify an optimal composite field, GF$(2^4)^2$ composite field that leads to the smallest unified Sbox and smallest cipher accelerator. For ease of illustration, only a small subset of the polynomials is plotted. In one exemplary implementation, an Sbox area of 72·μm² was obtained for the polynomials $x^4+x+1$ (ground field) and $x^2+x+1$ (extension field), labeled at point 430 of the graph. This is a significant area improvement compared to separate Sbox implementation for the three block ciphers. In various other embodiments, other ground field and extension field polynomials may be used. The actual area of the optimized Sbox may vary, without limitation.

Figure 4C:
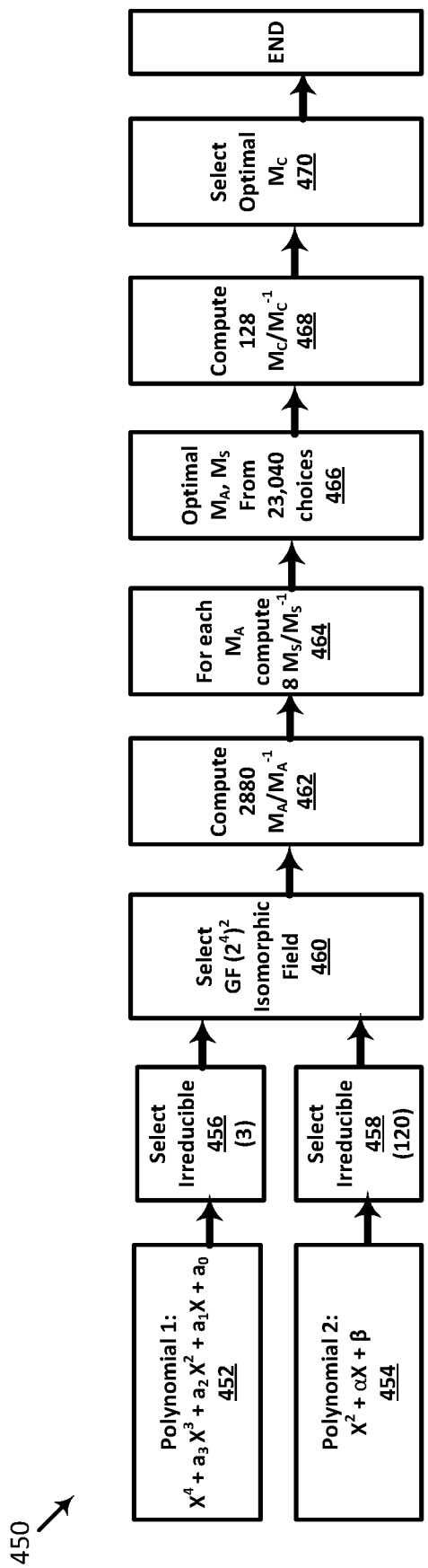
FIG. 4C is a block flow diagram illustrating a process of selecting an optimal polynomial for a unified Sbox, according to some embodiments.

FIG. 4C is a block flow diagram illustrating a process of selecting an optimal polynomial for a unified Sbox, according to some embodiments. As shown, process 450 at operation 452 is to select Polynomial 1: $X^4+a_3X^3+a_2X^2+a_1X+a_0$ and at operation 454 is to select Polynomial 2: $X^2+\alpha X+\beta$. At 454, irreducible instances of Polynomial 1 are selected, and at 458, irreducible instances of Polynomial 2 are selected. At 460, a GF $(2^4)^2$ Isomorphic field is selected. At 462, 2880 $M_A/M_A^{-1}$ are computed. At 464, for each $M_A$, 8 $M_S/M_S^{-1}$ are computed. At 466, Optimal $M_A$ and $M_S$ are selected from 23,040 choices. At 468, 128 $M_C/M_C^{-1}$ are computed. At 470, the optimal $M_C$ is selected, and the process ends.

Figure 5:
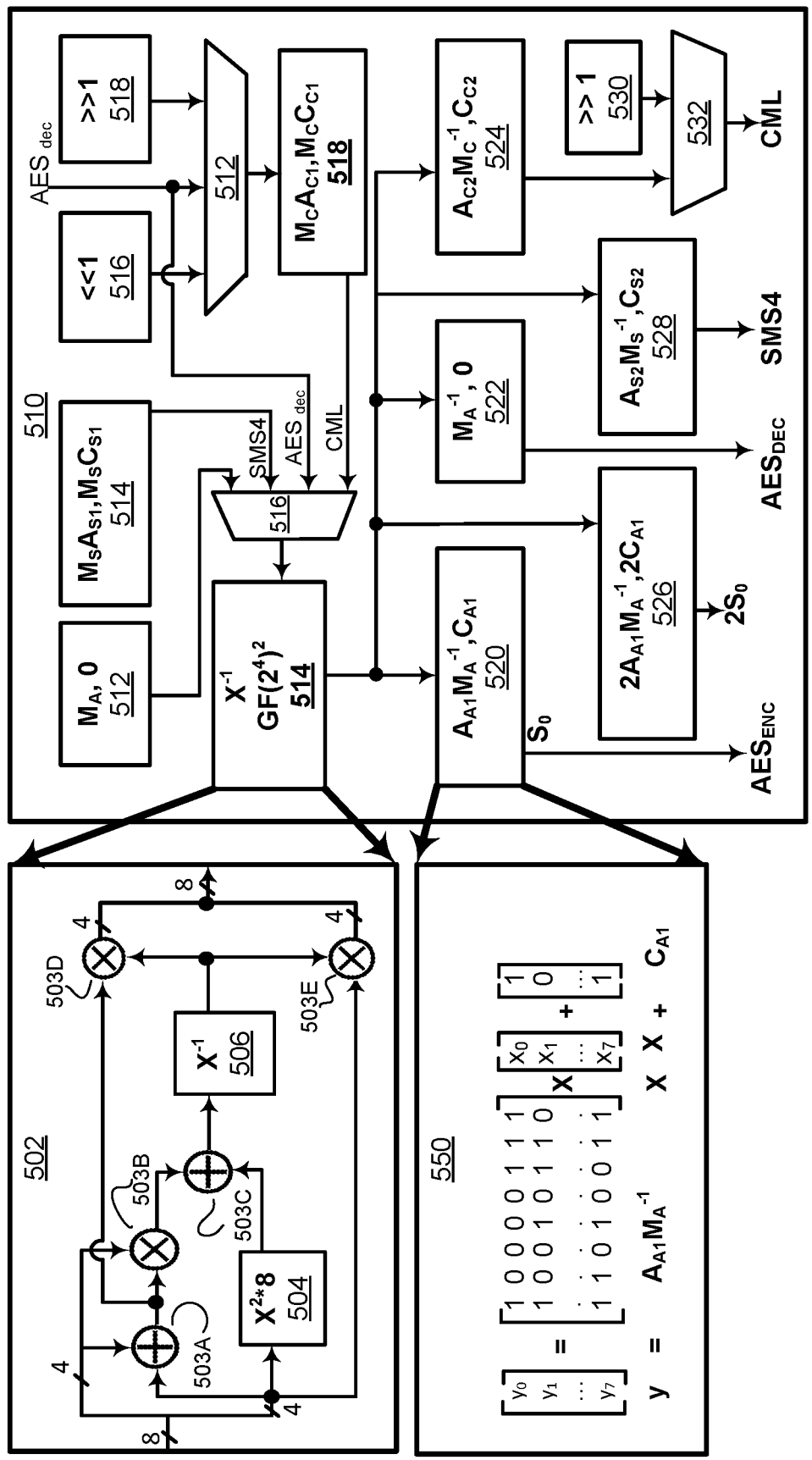
FIG. 5 is a block diagram illustrating a hybrid $GF(2^4)^2$ substitution box (Sbox) with mapped affine and shared inversion circuits, according to some embodiments.

FIG. 5 is a block diagram illustrating a Hybrid GF $(2^4)^2$ substitution box (Sbox) with mapped affine and shared inversion circuits, according to some embodiments. As shown, hybrid Sbox 510 includes an inversion circuit 514, a blown-up version of which is shown at 502, and eight mapping circuits 512, 514, 518, 520, 522, 524, 526, and 526, an exemplary, blown-up version of circuit 520 being shown at 550.

AES/SMS4/CML Sbox implementations involve affine transformations and GF$(2^8)$ inversion that account for a majority of total Sbox area. However, standard specific reduction-polynomial-based inverse computation reduces the potential for logic reuse in conventional designs. In contrast, the hybrid Sbox leverages GF$(2^8)$ to GF$(2^4)^2$ isomorphism to translate operands from AES/SMS4/CML specific fields to a unique composite field enabling inversion sharing (see FIG. 4A). Fusion of mapping ($M_A,M_S,M_C$) and inverse-mapping ($M_A^{-1},M_S^{-1},M_C^{-1}$) matrices for field conversion with existing AES/SMS4/CML affine transforms yield new mapped transforms with similar logic complexity without impacting critical path delay, while reducing Sbox area by replacing 8b multiplication and inversion units with 4b circuits.

Hybrid Sbox 510 includes an inverse operation 514, a blown-up version of which is illustrated at 502. As shown, 8-bit inverse operation circuit 502 includes adders 503A and 503CX, multipliers 503B, 503D, and 503E, squaring circuit 504, and 4-bit inversion operation circuit 506. Squaring circuit 504 is to take the square of 4 bits of the 8-bit input and add eight. 4-bit inverse operation circuit 506 is smaller and less complex than an 8-bit inverse operation would be. In some embodiments, 4-bit inverse operation is implemented with a lookup table (LUT) and in other embodiments it is calculated with circuitry. The hybrid inverse operation circuit 502 is much easier to implement and requires less circuit are than would an 8-bit inverter. As can be seen, inverse operation circuit 502 is to break an input from an 8-bit domain into two 4-bit domains. By translating input operands from their original 8-bit format into two 4-bit operands, making them much cheaper to process. To compute the inverse, you only need to compute with a 4 bit number. After the relatively simple, 4-bit multiplications 504 and 506, two 4-bit outputs are generated and are combined together to form an 8-bit output.

Hybrid Sbox 510 also includes eight mapping circuits 512, 514, 518, 520, 522, 524, 526, and 526, an exemplary, blown-up version of which is shown at 550. As shown, mapping circuit 550 is to multiply input X by A, and added by C. Hybrid Sbox 510, it should be noted, outputs both So and 2×S0, which will allow the AES cipher block to avoid using a multiplier to perform scaling, as is described further below.

Figure 6:
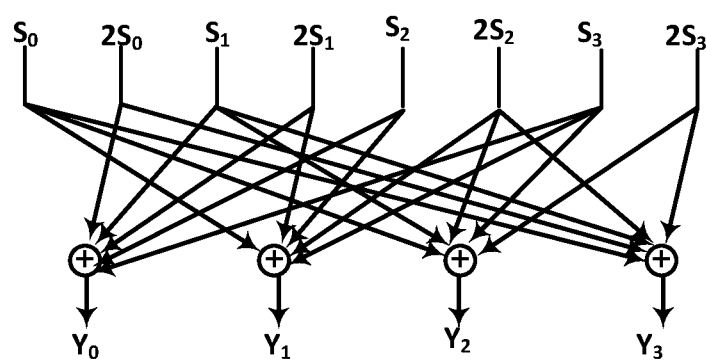
FIG. 6 is an Advanced Encryption Standard (AES) multiply-less Mix-Columns circuit, according to some embodiments.

FIG. 6 is an Advanced Encryption Standard (AES) multiply-less Mix-Columns circuit, according to some embodiments. According to some disclosed embodiments, a multiplication operation is removed from the AES data flow. Without the optimization, AES data paths perform mix-columns operations by scaling Sbox output bytes with (1,2,2,3). Such scaling circuits require 8b multiplication followed by reduction, which may comprise a significant penalty.

Instead, since SMS4 and CML do not include a multiplication in their flows, disclosed embodiments eliminate the multiplication operation required for performing a complex scaling factors (B,D,E,9). In contrast to conventional serial Sbox followed by mix-columns processing, the unified datapath computes Sbox outputs and their corresponding scaled outputs (×2) concurrently using scaled affine matrices, as illustrated in FIG. 6.

With reference to FIGS. 2 and 5, the Sboxes included in the disclosed cipher accelerator each provide an Sbox output (1×) and a scaled Sbox output (2×), which in some embodiments are added to produce the required scaled output (×3). This eliminates multiplication from the AES mix-columns critical path and balances the critical path delay across all three cipher modes. For inv. mix-columns, input bytes undergo affine scaling that concurrently multiples them with appropriate factors alongside $GF(2^8)$ to $GF(2^4)^2$ translation prior to Sbox operation (FIG. 4A). The absence of explicit multiplication in AES mix-columns/inv. mix-columns step improves datapath delay.

Figure 7:
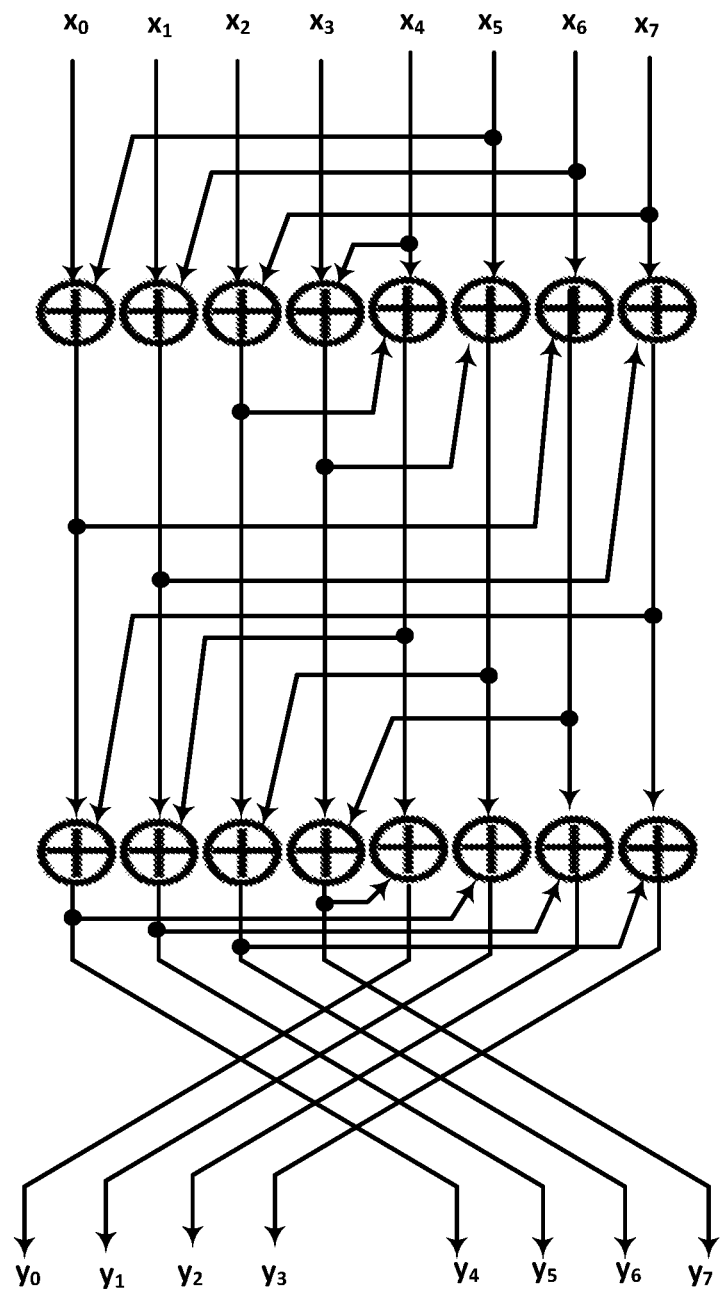
FIG. 7 is a block diagram illustrating a P function for use in performing a *Camellia* algorithm, according to some embodiments.

FIG. 7 is a block diagram illustrating a P function for use in performing a *Camellia* algorithm, according to some embodiments. Separating the two intra-Feistel CML shuffle functions ($FL/FL^{-1}$) from regular Sbox operation, and parallel execution of AES inverse-mix-columns/mix columns with SMS4-Mixing/CML-P (see, e.g., FIG. 2) steps further improves critical-path delay.

Figure 8:
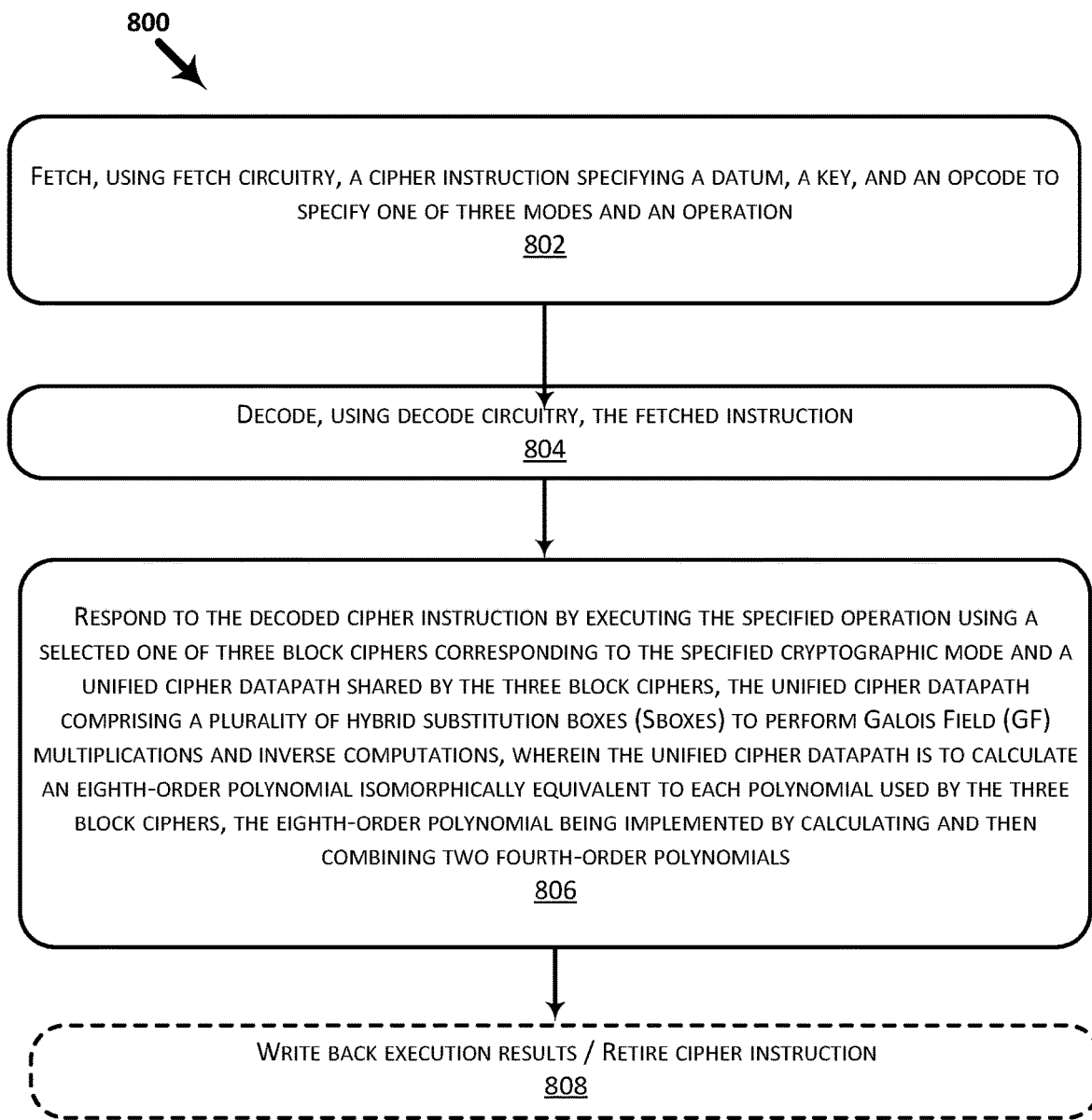
FIG. 8 is a flow diagram illustrating a computing apparatus executing a cipher instruction, according to some embodiments.

FIG. 8 is a block flow diagram illustrating a processor executing a cipher instruction, according to some embodiments. As shown, flow 800 begins at 802, where a computing apparatus, such as a processor, is to fetch, using fetch circuitry, a cipher instruction specifying a datum, a key, and an opcode to specify one of three modes and an operation. In disclosed embodiments, the three modes are AES, SMS4, and CML. At 804, the computing apparatus is to decode, using decode circuitry, the fetched cipher instruction. At 806, the computing apparatus is to respond to the decoded cipher instruction by using a selected one of three block ciphers corresponding to the specified cryptographic mode and a unified cipher datapath shared by the three block ciphers, the unified cipher datapath comprising a plurality of hybrid substitution boxes (Sboxes) to perform Galois Field (GF) multiplications and inverse computations, wherein the unified cipher datapath is to calculate an eighth-order polynomial isomorphically equivalent to each polynomial used by the three block ciphers, the eighth-order polynomial being implemented by calculating and then combining two fourth-order polynomials. In some embodiments, at 808, the processor is to write back execution results and retire the cipher instruction. Operation 808 is optional, as indicated by its dashed borders, insofar as it may occur at a different time, or not at all.

Figure 9:
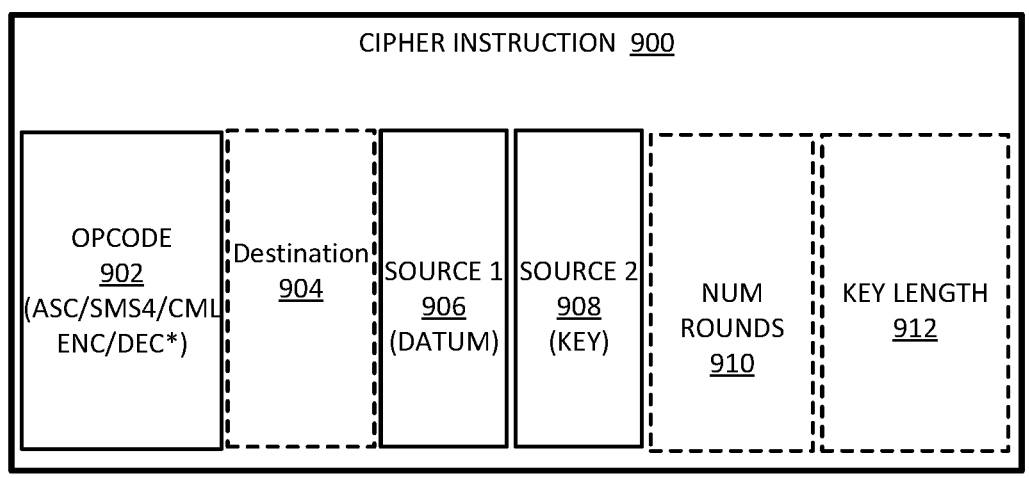
FIG. 9 is a format of a cipher instruction, according to some embodiments.

FIG. 9 is a format of a cipher instruction, according to some embodiments. As shown, cipher instruction 900 includes opcode 902 (ASC/SM4/CML-ENC/DEC*), and fields to specify source 1 906 (datum) and source 2 908 (key). Cipher instruction 900 further includes optional fields to specify a number of rounds 910 ([1],10,12,14, 18,24, and, 32), and key length 912, in terms of a number of bits. In some embodiments, cipher instruction 900 also specifies destination 904. When destination 904 is not included, the processor is to write a result of the operation to source 1 906. As indicated by their dashed borders, destination 904, data format 910, and key length 912 are optional, insofar as they may be omitted, in which case source 1 906 serves as the destination, a default number of rounds (1) and a default key length (128), are used. Opcode 902 is shown as including an asterisk to indicate that it may optionally include additional prefixes or suffixes to specify instruction behaviors. If cipher instruction 900 does not specify any of the optional parameters, predetermined default values are applied as needed. The format of cipher instruction 900 is further illustrated and described with respect to FIGS. 10A-B, 11A-D.

Instruction Sets

An instruction set may include one or more instruction formats. A given instruction format may define various fields (e.g., number of bits, location of bits) to specify, among other things, the operation to be performed (e.g., opcode) and the operand(s) on which that operation is to be performed and/or other data field(s) (e.g., mask). Some instruction formats are further broken down though the definition of instruction templates (or subformats). For example, the instruction templates of a given instruction format may be defined to have different subsets of the instruction format's fields (the included fields are typically in the same order, but at least some have different bit positions because there are less fields included) and/or defined to have a given field interpreted differently. Thus, each instruction of an ISA is expressed using a given instruction format (and, if defined, in a given one of the instruction templates of that instruction format) and includes fields for specifying the operation and the operands. For example, an exemplary ADD instruction has a specific opcode and an instruction format that includes an opcode field to specify that opcode and operand fields to select operands (sou rce1/destination and source2); and an occurrence of this ADD instruction in an instruction stream will have specific contents in the operand fields that select specific operands. A set of SIMD extensions referred to as the Advanced Vector Extensions (AVX) (AVX1 and AVX2) and using the Vector Extensions (VEX) coding scheme has been released and/or published (e.g., see Intel® 64 and IA-32 Architectures Software Developer's Manual, September 2014; and see Intel® Advanced Vector Extensions Programming Reference, October 2014).

Exemplary Instruction Formats

Embodiments of the instruction(s) described herein may be embodied in different formats. Additionally, exemplary systems, architectures, and pipelines are detailed below. Embodiments of the instruction(s) may be executed on such systems, architectures, and pipelines, but are not limited to those detailed.

Generic Vector Friendly Instruction Format

A vector friendly instruction format is an instruction format that is suited for vector instructions (e.g., there are certain fields specific to vector operations). While embodiments are described in which both vector and scalar operations are supported through the vector friendly instruction format, alternative embodiments use only vector operations the vector friendly instruction format.

Figure 10A:
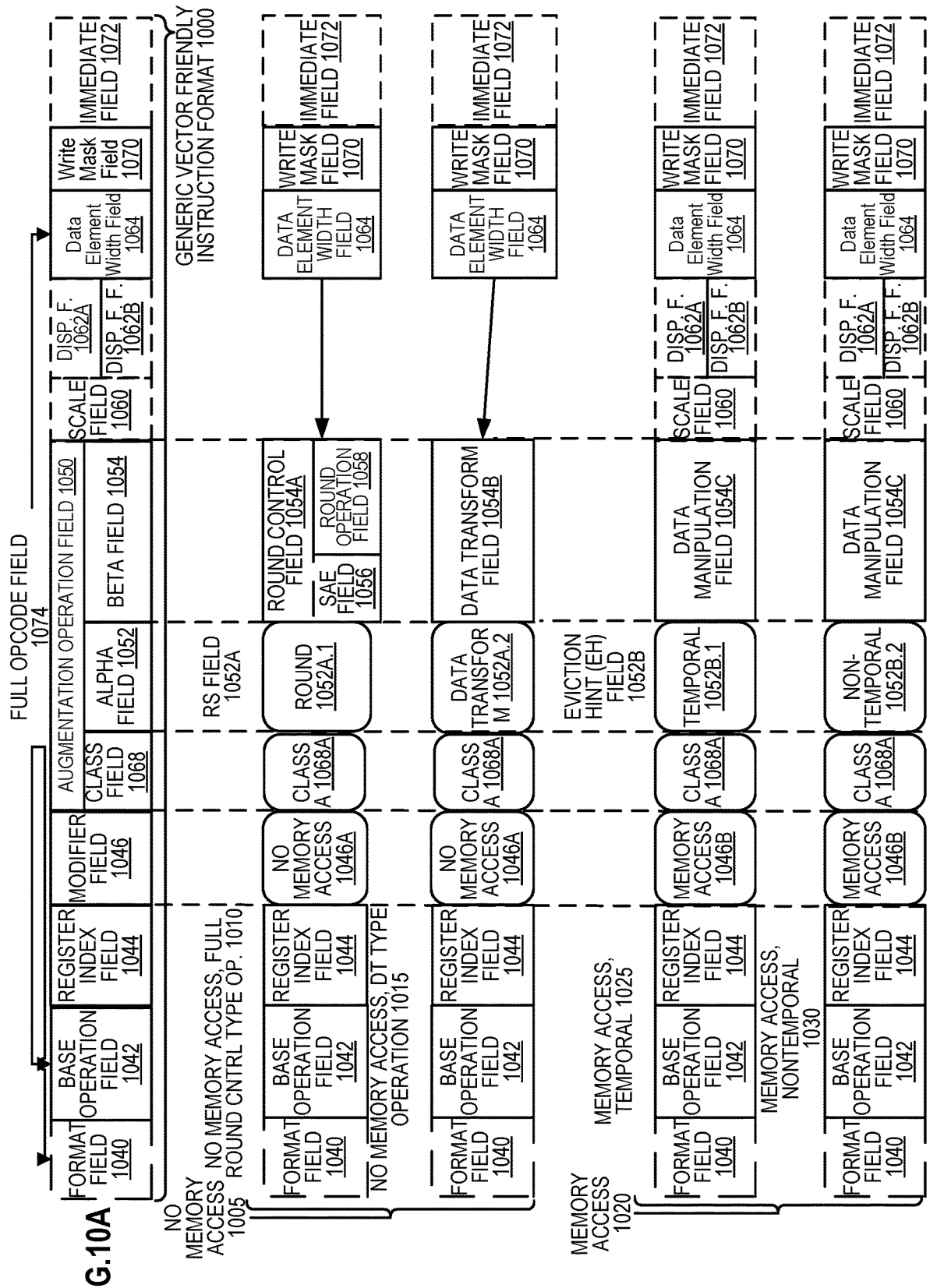
FIGS. 10A-10B are block diagrams illustrating a generic vector friendly instruction format and instruction templates thereof according to some embodiments of the invention.
Figure 10B:
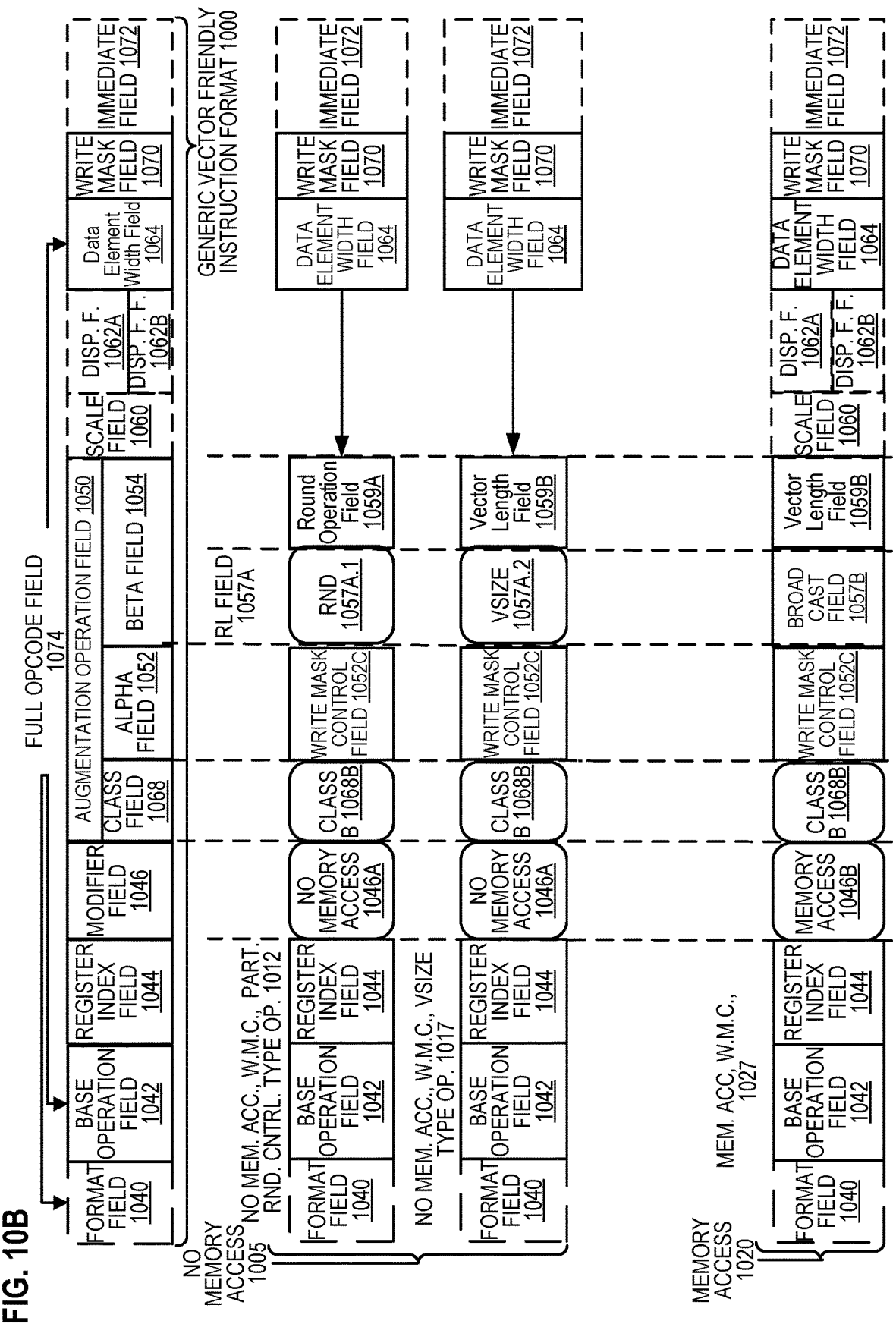

FIGS. 10A-10B are block diagrams illustrating a generic vector friendly instruction format and instruction templates thereof according to some embodiments of the invention. FIG. 10A is a block diagram illustrating a generic vector friendly instruction format and class A instruction templates thereof according to some embodiments of the invention; while FIG. 10B is a block diagram illustrating the generic vector friendly instruction format and class B instruction templates thereof according to some embodiments of the invention. Specifically, a generic vector friendly instruction format 1000 for which are defined class A and class B instruction templates, both of which include no memory access 1005 instruction templates and memory access 1020 instruction templates. The term generic in the context of the vector friendly instruction format refers to the instruction format not being tied to any specific instruction set.

While embodiments of the invention will be described in which the vector friendly instruction format supports the following: a 64 byte vector operand length (or size) with 32 bit (4 byte) or 64 bit (8 byte) data element widths (or sizes) (and thus, a 64 byte vector consists of either 16 doubleword-size elements or alternatively, 8 quadword-size elements); a 64 byte vector operand length (or size) with 16 bit (2 byte) or 8 bit (1 byte) data element widths (or sizes); a 32 byte vector operand length (or size) with 32 bit (4 byte), 64 bit (8 byte), 16 bit (2 byte), or 8 bit (1 byte) data element widths (or sizes); and a 16 byte vector operand length (or size) with 32 bit (4 byte), 64 bit (8 byte), 16 bit (2 byte), or 8 bit (1 byte) data element widths (or sizes); alternative embodiments may support more, less and/or different vector operand sizes (e.g., 256 byte vector operands) with more, less, or different data element widths (e.g., 128 bit (16 byte) data element widths).

The class A instruction templates in FIG. 10A include: 1) within the no memory access 1005 instruction templates there is shown a no memory access, full round control type operation 1010 instruction template and a no memory access, data transform type operation 1015 instruction template; and 2) within the memory access 1020 instruction templates there is shown a memory access, temporal 1025 instruction template and a memory access, non-temporal 1030 instruction template. The class B instruction templates in FIG. 10B include: 1) within the no memory access 1005 instruction templates there is shown a no memory access, write mask control, partial round control type operation 1012 instruction template and a no memory access, write mask control, vsize type operation 1017 instruction template; and 2) within the memory access 1020 instruction templates there is shown a memory access, write mask control 1027 instruction template.

The generic vector friendly instruction format 1000 includes the following fields listed below in the order illustrated in FIGS. 10A-10B.

Format field 1040—a specific value (an instruction format identifier value) in this field uniquely identifies the vector friendly instruction format, and thus occurrences of instructions in the vector friendly instruction format in instruction streams. As such, this field is optional in the sense that it is not needed for an instruction set that has only the generic vector friendly instruction format.

Base operation field 1042—its content distinguishes different base operations.

Register index field 1044—its content, directly or through address generation, specifies the locations of the source and destination operands, be they in registers or in memory. These include a sufficient number of bits to select N registers from a P×Q (e.g. 32×512, 16×128, 32×1024, 64×1024) register file. While in one embodiment N may be up to three sources and one destination register, alternative embodiments may support more or less sources and destination registers (e.g., may support up to two sources where one of these sources also acts as the destination, may support up to three sources where one of these sources also acts as the destination, may support up to two sources and one destination).

Modifier field 1046—its content distinguishes occurrences of instructions in the generic vector instruction format that specify memory access from those that do not; that is, between no memory access 1005 instruction templates and memory access 1020 instruction templates. Memory access operations read and/or write to the memory hierarchy (in some cases specifying the source and/or destination addresses using values in registers), while non-memory access operations do not (e.g., the source and destinations are registers). While in one embodiment this field also selects between three different ways to perform memory address calculations, alternative embodiments may support more, less, or different ways to perform memory address calculations.

Augmentation operation field 1050—its content distinguishes which one of a variety of different operations to be performed in addition to the base operation. This field is context specific. In some embodiments, this field is divided into a class field 1068, an alpha field 1052, and a beta field 1054. The augmentation operation field 1050 allows common groups of operations to be performed in a single instruction rather than 2, 3, or 4 instructions.

Scale field 1060—its content allows for the scaling of the index field's content for memory address generation (e.g., for address generation that uses $2^{scale}*$index+base).

Displacement Field 1062A—its content is used as part of memory address generation (e.g., for address generation that uses $2^{scale}*$index+base+displacement).

Displacement Factor Field 1062B (note that the juxtaposition of displacement field 1062A directly over displacement factor field 1062B indicates one or the other is used)—its content is used as part of address generation; it specifies a displacement factor that is to be scaled by the size of a memory access (N)—where N is the number of bytes in the memory access (e.g., for address generation that uses $2^{scale}*$index+base+scaled displacement). Redundant low-order bits are ignored and hence, the displacement factor field's content is multiplied by the memory operands total size (N) in order to generate the final displacement to be used in calculating an effective address. The value of N is determined by the processor hardware at runtime based on the full opcode field 1074 (described later herein) and the data manipulation field 1054C. The displacement field 1062A and the displacement factor field 1062B are optional in the sense that they are not used for the no memory access 1005 instruction templates and/or different embodiments may implement only one or none of the two.

Data element width field 1064—its content distinguishes which one of a number of data element widths is to be used (in some embodiments for all instructions; in other embodiments for only some of the instructions). This field is optional in the sense that it is not needed if only one data element width is supported and/or data element widths are supported using some aspect of the opcodes.

Write mask field 1070—its content controls, on a per data element position basis, whether that data element position in the destination vector operand reflects the result of the base operation and augmentation operation. Class A instruction templates support merging-writemasking, while class B instruction templates support both merging- and zeroing-writemasking. When merging, vector masks allow any set of elements in the destination to be protected from updates during the execution of any operation (specified by the base operation and the augmentation operation); in other one embodiment, preserving the old value of each element of the destination where the corresponding mask bit has a 0. In contrast, when zeroing vector masks allow any set of elements in the destination to be zeroed during the execution of any operation (specified by the base operation and the augmentation operation); in one embodiment, an element of the destination is set to 0 when the corresponding mask bit has a 0 value. A subset of this functionality is the ability to control the vector length of the operation being performed (that is, the span of elements being modified, from the first to the last one); however, it is not necessary that the elements that are modified be consecutive. Thus, the write mask field 1070 allows for partial vector operations, including loads, stores, arithmetic, logical, etc. While embodiments of the invention are described in which the write mask field's 1070 content selects one of a number of write mask registers that contains the write mask to be used (and thus the write mask field's 1070 content indirectly identifies that masking to be performed), alternative embodiments instead or additional allow the mask write field's 1070 content to directly specify the masking to be performed.

Immediate field 1072—its content allows for the specification of an immediate. This field is optional in the sense that is it not present in an implementation of the generic vector friendly format that does not support immediate and it is not present in instructions that do not use an immediate.

Class field 1068—its content distinguishes between different classes of instructions. With reference to FIGS. 10A-B, the contents of this field select between class A and class B instructions. In FIGS. 10A-B, rounded corner squares are used to indicate a specific value is present in a field (e.g., class A 1068A and class B 1068B for the class field 1068 respectively in FIGS. 10A-B).

Instruction Templates of Class A

In the case of the non-memory access 1005 instruction templates of class A, the alpha field 1052 is interpreted as an RS field 1052A, whose content distinguishes which one of the different augmentation operation types are to be performed (e.g., round 1052A.1 and data transform 1052A.2 are respectively specified for the no memory access, round type operation 1010 and the no memory access, data transform type operation 1015 instruction templates), while the beta field 1054 distinguishes which of the operations of the specified type is to be performed. In the no memory access 1005 instruction templates, the scale field 1060, the displacement field 1062A, and the displacement scale filed 1062B are not present.

No-Memory Access Instruction Templates—Full Round Control Type Operation

In the no memory access full round control type operation 1010 instruction template, the beta field 1054 is interpreted as a round control field 1054A, whose content(s) provide static rounding. While in the described embodiments of the invention the round control field 1054A includes a suppress all floating point exceptions (SAE) field 1056 and a round operation control field 1058, alternative embodiments may support may encode both these concepts into the same field or only have one or the other of these concepts/fields (e.g., may have only the round operation control field 1058).

SAE field 1056—its content distinguishes whether or not to disable the exception event reporting; when the SAE field's 1056 content indicates suppression is enabled, a given instruction does not report any kind of floating-point exception flag and does not raise any floating point exception handler.

Round operation control field 1058—its content distinguishes which one of a group of rounding operations to perform (e.g., Round-up, Round-down, Round-towards-zero and Round-to-nearest). Thus, the round operation control field 1058 allows for the changing of the rounding mode on a per instruction basis. In some embodiments where a processor includes a control register for specifying rounding modes, the round operation control field's 1050 content overrides that register value.

No Memory Access Instruction Templates—Data Transform Type Operation

In the no memory access data transform type operation 1015 instruction template, the beta field 1054 is interpreted as a data transform field 10546, whose content distinguishes which one of a number of data transforms is to be performed (e.g., no data transform, swizzle, broadcast).

In the case of a memory access 1020 instruction template of class A, the alpha field 1052 is interpreted as an eviction hint field 10526, whose content distinguishes which one of the eviction hints is to be used (in FIG. 10A, temporal 10526.1 and non-temporal 10526.2 are respectively specified for the memory access, temporal 1025 instruction template and the memory access, non-temporal 1030 instruction template), while the beta field 1054 is interpreted as a data manipulation field 1054C, whose content distinguishes which one of a number of data manipulation operations (also known as primitives) is to be performed (e.g., no manipulation; broadcast; up conversion of a source; and down conversion of a destination). The memory access 1020 instruction templates include the scale field 1060, and optionally the displacement field 1062A or the displacement scale field 10626.

Vector memory instructions perform vector loads from and vector stores to memory, with conversion support. As with regular vector instructions, vector memory instructions transfer data from/to memory in a data element-wise fashion, with the elements that are actually transferred is dictated by the contents of the vector mask that is selected as the write mask.

Memory Access Instruction Templates—Temporal

Temporal data is data likely to be reused soon enough to benefit from caching. This is, however, a hint, and different processors may implement it in different ways, including ignoring the hint entirely.

Memory Access Instruction Templates—Non-Temporal

Non-temporal data is data unlikely to be reused soon enough to benefit from caching in the 1st-level cache and should be given priority for eviction. This is, however, a hint, and different processors may implement it in different ways, including ignoring the hint entirely.

Instruction Templates of Class B

In the case of the instruction templates of class B, the alpha field 1052 is interpreted as a write mask control (Z) field 1052C, whose content distinguishes whether the write masking controlled by the write mask field 1070 should be a merging or a zeroing.

In the case of the non-memory access 1005 instruction templates of class B, part of the beta field 1054 is interpreted as an RL field 1057A, whose content distinguishes which one of the different augmentation operation types are to be performed (e.g., round 1057A.1 and vector length (VSIZE) 1057A.2 are respectively specified for the no memory access, write mask control, partial round control type operation 1012 instruction template and the no memory access, write mask control, VSIZE type operation 1017 instruction template), while the rest of the beta field 1054 distinguishes which of the operations of the specified type is to be performed. In the no memory access 1005 instruction templates, the scale field 1060, the displacement field 1062A, and the displacement scale filed 1062B are not present.

In the no memory access, write mask control, partial round control type operation 1010 instruction template, the rest of the beta field 1054 is interpreted as a round operation field 1059A and exception event reporting is disabled (a given instruction does not report any kind of floating-point exception flag and does not raise any floating point exception handler).

Round operation control field 1059A—just as round operation control field 1058, its content distinguishes which one of a group of rounding operations to perform (e.g., Round-up, Round-down, Round-towards-zero and Round-to-nearest). Thus, the round operation control field 1059A allows for the changing of the rounding mode on a per instruction basis. In some embodiments where a processor includes a control register for specifying rounding modes, the round operation control field's 1050 content overrides that register value.

In the no memory access, write mask control, VSIZE type operation 1017 instruction template, the rest of the beta field 1054 is interpreted as a vector length field 1059B, whose content distinguishes which one of a number of data vector lengths is to be performed on (e.g., 128, 256, or 512 byte).

In the case of a memory access 1020 instruction template of class B, part of the beta field 1054 is interpreted as a broadcast field 1057B, whose content distinguishes whether or not the broadcast type data manipulation operation is to be performed, while the rest of the beta field 1054 is interpreted the vector length field 1059B. The memory access 1020 instruction templates include the scale field 1060, and optionally the displacement field 1062A or the displacement scale field 1062B.

With regard to the generic vector friendly instruction format 1000, a full opcode field 1074 is shown including the format field 1040, the base operation field 1042, and the data element width field 1064. While one embodiment is shown where the full opcode field 1074 includes all of these fields, the full opcode field 1074 includes less than all of these fields in embodiments that do not support all of them. The full opcode field 1074 provides the operation code (opcode).

The augmentation operation field 1050, the data element width field 1064, and the write mask field 1070 allow these features to be specified on a per instruction basis in the generic vector friendly instruction format.

The combination of write mask field and data element width field create typed instructions in that they allow the mask to be applied based on different data element widths.

The various instruction templates found within class A and class B are beneficial in different situations. In some embodiments of the invention, different processors or different cores within a processor may support only class A, only class B, or both classes. For instance, a high performance general purpose out-of-order core intended for general-purpose computing may support only class B, a core intended primarily for graphics and/or scientific (throughput) computing may support only class A, and a core intended for both may support both (of course, a core that has some mix of templates and instructions from both classes but not all templates and instructions from both classes is within the purview of the invention). Also, a single processor may include multiple cores, all of which support the same class or in which different cores support different class. For instance, in a processor with separate graphics and general purpose cores, one of the graphics cores intended primarily for graphics and/or scientific computing may support only class A, while one or more of the general purpose cores may be high performance general purpose cores with out of order execution and register renaming intended for general-purpose computing that support only class B. Another processor that does not have a separate graphics core, may include one more general purpose in-order or out-of-order cores that support both class A and class B. Of course, features from one class may also be implement in the other class in different embodiments of the invention. Programs written in a high level language would be put (e.g., just in time compiled or statically compiled) into an variety of different executable forms, including: 1) a form having only instructions of the class(es) supported by the target processor for execution; or 2) a form having alternative routines written using different combinations of the instructions of all classes and having control flow code that selects the routines to execute based on the instructions supported by the processor which is currently executing the code.

Exemplary Specific Vector Friendly Instruction Format

FIG. 11A is a block diagram illustrating an exemplary specific vector friendly instruction format according to some embodiments of the invention. FIG. 11A shows a specific vector friendly instruction format 1100 that is specific in the sense that it specifies the location, size, interpretation, and order of the fields, as well as values for some of those fields. The specific vector friendly instruction format 1100 may be used to extend the x86 instruction set, and thus some of the fields are similar or the same as those used in the existing x86 instruction set and extension thereof (e.g., AVX). This format remains consistent with the prefix encoding field, real opcode byte field, MOD RIM field, SIB field, displacement field, and immediate fields of the existing x86 instruction set with extensions. The fields from FIG. 10 into which the fields from FIG. 11A map are illustrated.

It should be understood that, although embodiments of the invention are described with reference to the specific vector friendly instruction format 1100 in the context of the generic vector friendly instruction format 1000 for illustrative purposes, the invention is not limited to the specific vector friendly instruction format 1100 except where claimed. For example, the generic vector friendly instruction format 1000 contemplates a variety of possible sizes for the various fields, while the specific vector friendly instruction format 1100 is shown as having fields of specific sizes. By way of specific example, while the data element width field 1064 is illustrated as a one bit field in the specific vector friendly instruction format 1100, the invention is not so limited (that is, the generic vector friendly instruction format 1000 contemplates other sizes of the data element width field 1064).

The generic vector friendly instruction format 1000 includes the following fields listed below in the order illustrated in FIG. 11A.

EVEX Prefix (Bytes 0-3) 1102—is encoded in a four-byte form.

Format Field 1040 (EVEX Byte 0, bits [7:0])—the first byte (EVEX Byte 0) is the format field 1040 and it contains 0x62 (the unique value used for distinguishing the vector friendly instruction format in some embodiments).

The second-fourth bytes (EVEX Bytes 1-3) include a number of bit fields providing specific capability.

REX field 1105 (EVEX Byte 1, bits [7-5])—consists of a EVEX.R bit field (EVEX Byte 1, bit [7]—R), EVEX.X bit field (EVEX byte 1, bit [6]—X), and 1057BEX byte 1, bit[5]—B). The EVEX.R, EVEX.X, and EVEX.B bit fields provide the same functionality as the corresponding VEX bit fields, and are encoded using 1s complement form, i.e. ZMM0 is encoded as 1111B, ZMM15 is encoded as 0000B. Other fields of the instructions encode the lower three bits of the register indexes as is known in the art (rrr, xxx, and bbb), so that Rrrr, Xxxx, and Bbbb may be formed by adding EVEX.R, EVEX.X, and EVEX.B.

REX' 1110A—this is the first part of the REX' field 1110 and is the EVEX.R' bit field (EVEX Byte 1, bit [4]—R') that is used to encode either the upper 16 or lower 16 of the extended 32 register set. In some embodiments, this bit, along with others as indicated below, is stored in bit inverted format to distinguish (in the well-known x86 32-bit mode) from the BOUND instruction, whose real opcode byte is 62, but does not accept in the MOD R/M field (described below) the value of 11 in the MOD field; alternative embodiments of the invention do not store this and the other indicated bits below in the inverted format. A value of 1 is used to encode the lower 16 registers. In other words, R'Rrrr is formed by combining EVEX.R', EVEX.R, and the other RRR from other fields.

Opcode map field 1115 (EVEX byte 1, bits [3:0]—mmmm)—its content encodes an implied leading opcode byte (0F, 0F 38, or 0F 3).

Data element width field 1064 (EVEX byte 2, bit [7]—W)—is represented by the notation EVEX.W. EVEX.W is used to define the granularity (size) of the datatype (either 32-bit data elements or 64-bit data elements).

EVEX.vvvv 1120 (EVEX Byte 2, bits [6:3]-vvvv)—the role of EVEX.vvvv may include the following: 1) EVEX.vvvv encodes the first source register operand, specified in inverted (1s complement) form and is valid for instructions with 2 or more source operands; 2) EVEX.vvvv encodes the destination register operand, specified in 1s complement form for certain vector shifts; or 3) EVEX.vvvv does not encode any operand, the field is reserved and should contain 1111b. Thus, EVEX.vvvv field 1120 encodes the 4 low-order bits of the first source register specifier stored in inverted (1s complement) form. Depending on the instruction, an extra different EVEX bit field is used to extend the specifier size to 32 registers.

EVEX.U 1068 Class field (EVEX byte 2, bit [2]-U)—If EVEX.0=0, it indicates class A or EVEX.U0; if EVEX.0=1, it indicates class B or EVEX.U1.

Prefix encoding field 1125 (EVEX byte 2, bits [1:0]-pp)—provides additional bits for the base operation field. In addition to providing support for the legacy SSE instructions in the EVEX prefix format, this also has the benefit of compacting the SIMD prefix (rather than requiring a byte to express the SIMD prefix, the EVEX prefix requires only 2 bits). In one embodiment, to support legacy SSE instructions that use a SIMD prefix (66H, F2H, F3H) in both the legacy format and in the EVEX prefix format, these legacy SIMD prefixes are encoded into the SIMD prefix encoding field; and at runtime are expanded into the legacy SIMD prefix prior to being provided to the decoder's PLA (so the PLA can execute both the legacy and EVEX format of these legacy instructions without modification). Although newer instructions could use the EVEX prefix encoding field's content directly as an opcode extension, certain embodiments expand in a similar fashion for consistency but allow for different meanings to be specified by these legacy SIMD prefixes. An alternative embodiment may redesign the PLA to support the 2 bit SIMD prefix encodings, and thus not require the expansion.

Alpha field 1052 (EVEX byte 3, bit [7]—EH; also known as EVEX.EH, EVEX.rs, EVEX.RL, EVEX.write mask control, and EVEX.N; also illustrated with a)—as previously described, this field is context specific.

Beta field 1054 (EVEX byte 3, bits [6:4]-SSS, also known as EVEX.$s_{2-0}$, EVEX.$r_{2-0}$, EVEX.rr1, EVEX.LL0, EVEX.LLB; also illustrated with βββ)—as previously described, this field is context specific.

REX' 1110B—this is the remainder of the REX' field 1110 and is the EVEX.V' bit field (EVEX Byte 3, bit [3]—V') that may be used to encode either the upper 16 or lower 16 of the extended 32 register set. This bit is stored in bit inverted format. A value of 1 is used to encode the lower 16 registers. In other words, V'VVVV is formed by combining EVEX.V', EVEX.vvvv.

Write mask field 1070 (EVEX byte 3, bits [2:0]-kkk)—its content specifies the index of a register in the write mask registers as previously described. In some embodiments, the specific value EVEX.kkk=000 has a special behavior implying no write mask is used for the particular instruction (this may be implemented in a variety of ways including the use of a write mask hardwired to all ones or hardware that bypasses the masking hardware).

Real Opcode Field 1130 (Byte 4) is also known as the opcode byte. Part of the opcode is specified in this field.

MOD R/M Field 1140 (Byte 5) includes MOD field 1142, Reg field 1144, and R/M field 1146. As previously described, the MOD field's 1142 content distinguishes between memory access and non-memory access operations. The role of Reg field 1144 can be summarized to two situations: encoding either the destination register operand or a source register operand or be treated as an opcode extension and not used to encode any instruction operand. The role of R/M field 1146 may include the following: encoding the instruction operand that references a memory address or encoding either the destination register operand or a source register operand.

Scale, Index, Base (SIB) Byte (Byte 6)—As previously described, the scale field's 1050 content is used for memory address generation. SIB.xxx 1154 and SIB.bbb 1156—the contents of these fields have been previously referred to with regard to the register indexes Xxxx and Bbbb.

Displacement field 1062A (Bytes 7-10)—when MOD field 1142 contains 10, bytes 7-10 are the displacement field 1062A, and it works the same as the legacy 32-bit displacement (disp32) and works at byte granularity.

Displacement factor field 1062B (Byte 7)—when MOD field 1142 contains 01, byte 7 is the displacement factor field 1062B. The location of this field is that same as that of the legacy x86 instruction set 8-bit displacement (disp8), which works at byte granularity. Since disp8 is sign extended, it can only address between −128 and 127 bytes offsets; in terms of 64 byte cache lines, disp8 uses 8 bits that can be set to only four really useful values −128, −64, 0, and 64; since a greater range is often needed, disp32 is used; however, disp32 requires 4 bytes. In contrast to disp8 and disp32, the displacement factor field 1062B is a reinterpretation of disp8; when using displacement factor field 1062B, the actual displacement is determined by the content of the displacement factor field multiplied by the size of the memory operand access (N). This type of displacement is referred to as disp8*N. This reduces the average instruction length (a single byte of used for the displacement but with a much greater range). Such compressed displacement is based on the assumption that the effective displacement is multiple of the granularity of the memory access, and hence, the redundant low-order bits of the address offset do not need to be encoded. In other words, the displacement factor field 1062B substitutes the legacy x86 instruction set 8-bit displacement. Thus, the displacement factor field 1062B is encoded the same way as an x86 instruction set 8-bit displacement (so no changes in the ModRM/SIB encoding rules) with the only exception that disp8 is overloaded to disp8*N. In other words, there are no changes in the encoding rules or encoding lengths but only in the interpretation of the displacement value by hardware (which needs to scale the displacement by the size of the memory operand to obtain a byte-wise address offset). Immediate field 1072 operates as previously described.

Full Opcode Field

FIG. 11B is a block diagram illustrating the fields of the specific vector friendly instruction format that make up the full opcode field, according to some embodiments. Specifically, the full opcode field 1074 includes the format field 1040, the base operation field 1042, and the data element width (W) field 1064. The base operation field 1042 includes the prefix encoding field 1125, the opcode map field 1115, and the real opcode field 1130.

Register Index Field

FIG. 11C is a block diagram illustrating the fields of the specific vector friendly instruction format that make up the register index field, according to some embodiments. Specifically, the register index field 1044 includes the REX field 1105, the REX' field 1110, the MODR/M.reg field 1144, the MODR/M.r/m field 1146, the VVVV field 1120, xxx field 1154, and the bbb field 1156.

Augmentation Operation Field

Figure 11D:
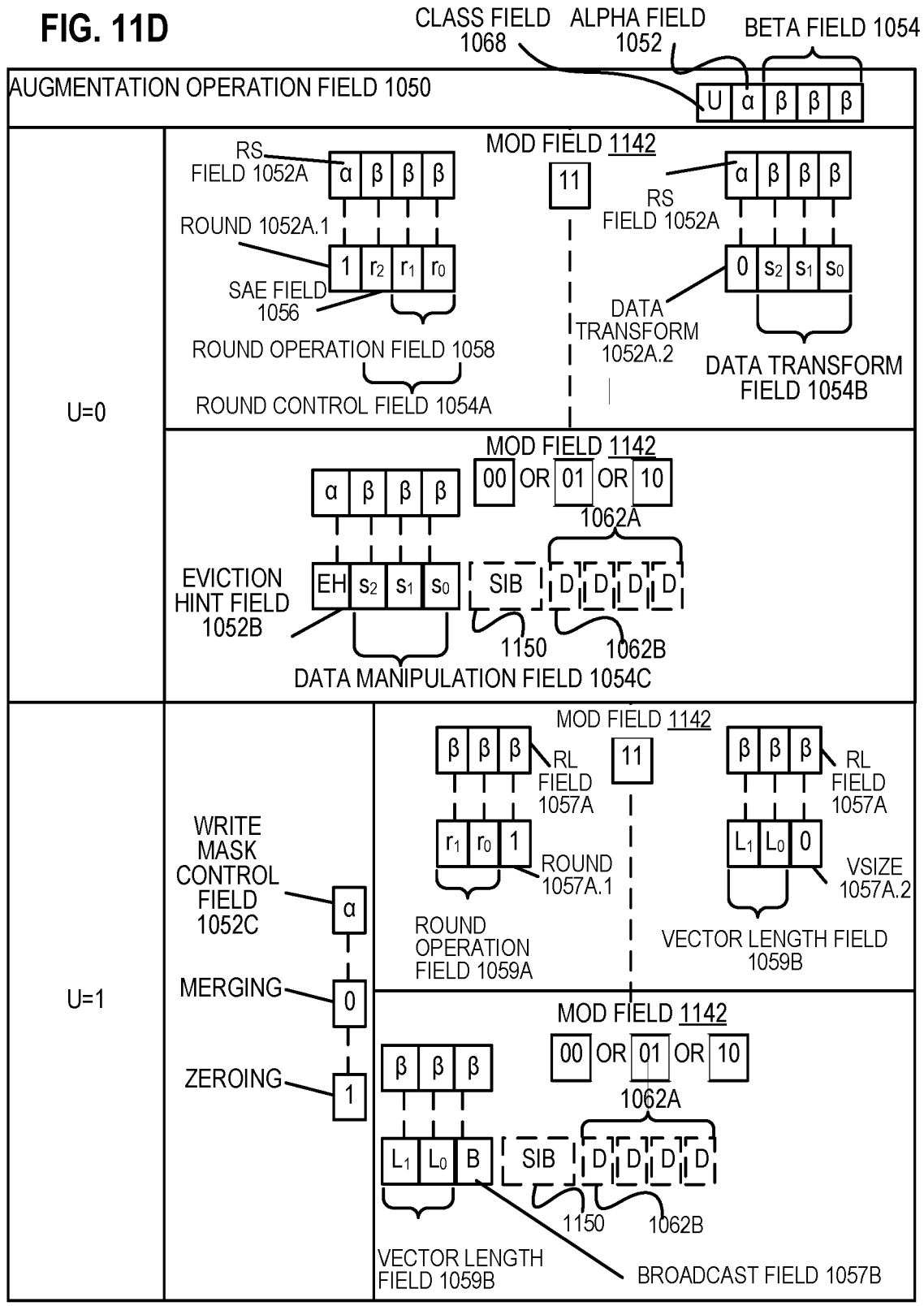
FIG. 11D is a block diagram illustrating the fields of the specific vector friendly instruction format that make up the augmentation operation field according to one embodiment.

FIG. 11D is a block diagram illustrating the fields of the specific vector friendly instruction format that make up the augmentation operation field according to some embodiments. When the class (U) field 1068 contains 0, it signifies EVEX.U0 (class A 1068A); when it contains 1, it signifies EVEX.U1 (class B 1068B). When U=0 and the MOD field 1142 contains 11 (signifying a no memory access operation), the alpha field 1052 (EVEX byte 3, bit [7]—EH) is interpreted as the rs field 1052A. When the rs field 1052A contains a 1 (round 1052A.1), the beta field 1054 (EVEX byte 3, bits [6:4]—SSS) is interpreted as the round control field 1054A. The round control field 1054A includes a one bit SAE field 1056 and a two bit round operation field 1058. When the rs field 1052A contains a 0 (data transform 1052A.2), the beta field 1054 (EVEX byte 3, bits [6:4]—SSS) is interpreted as a three bit data transform field 1054B. When U=0 and the MOD field 1142 contains 00, 01, or 10 (signifying a memory access operation), the alpha field 1052 (EVEX byte 3, bit [7]—EH) is interpreted as the eviction hint (EH) field 1052B and the beta field 1054 (EVEX byte 3, bits [6:4]—SSS) is interpreted as a three bit data manipulation field 1054C.

When U=1, the alpha field 1052 (EVEX byte 3, bit [7]—EH) is interpreted as the write mask control (Z) field 1052C. When U=1 and the MOD field 1142 contains 11 (signifying a no memory access operation), part of the beta field 1054 (EVEX byte 3, bit [4]—$S_0$) is interpreted as the RL field 1057A; when it contains a 1 (round 1057A.1) the rest of the beta field 1054 (EVEX byte 3, bit [6-5]—$S_{2-1}$) is interpreted as the round operation field 1059A, while when the RL field 1057A contains a 0 (VSIZE 1057.A2) the rest of the beta field 1054 (EVEX byte 3, bit [6-5]—$S_{2-1}$) is interpreted as the vector length field 1059B (EVEX byte 3, bit [6-5]—$L_{1-0}$). When U=1 and the MOD field 1142 contains 00, 01, or 10 (signifying a memory access operation), the beta field 1054 (EVEX byte 3, bits [6:4]—SSS) is interpreted as the vector length field 1059B (EVEX byte 3, bit [6-5]—$L_{1-0}$) and the broadcast field 1057B (EVEX byte 3, bit [4]—B).

Exemplary Register Architecture

Figure 12:
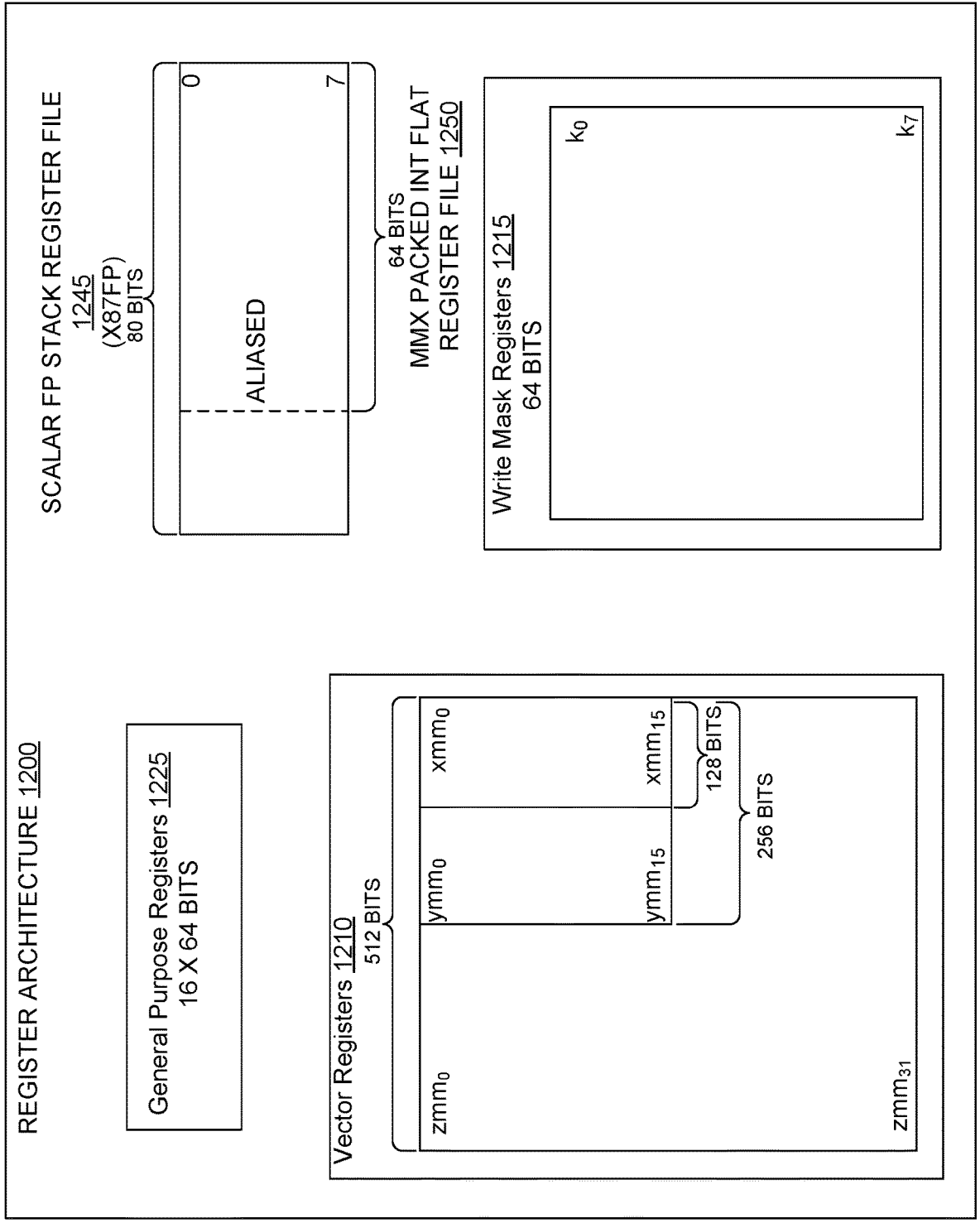
FIG. 12 is a block diagram of a register architecture according to one embodiment.

FIG. 12 is a block diagram of a register architecture according to some embodiments. In the embodiment illustrated, there are 32 vector registers 1210 that are 512 bits wide; these registers are referenced as zmm0 through zmm31. The lower order 256 bits of the lower 16 zmm registers are overlaid on registers ymm0-16. The lower order 128 bits of the lower 16 zmm registers (the lower order 128 bits of the ymm registers) are overlaid on registers xmm0-15. The specific vector friendly instruction format 1100 operates on these overlaid register file as illustrated in the below tables.

| Adjustable Vector Length | Class | Operations | Registers |
|---|---|---|---|
| Instruction Templates that do not include the vector length field 1059B | A (FIG. 10A; U = 0) | 1010, 1015, 1025,1030 | zmm registers (the vector length is 64 byte) |
| | B (FIG. 10B; U = 1) | 1012 | zmm registers (the vector length is 64 byte) |
| Instruction templates that do include the vector length field 1059B | B (FIG. 10B; U = 1) | 1017, 1027 | zmm, ymm, or xmm registers (the vector length is 64 byte, 32 byte, or 16 byte) depending on the vector length field 1059B |

In other words, the vector length field 1059B selects between a maximum length and one or more other shorter lengths, where each such shorter length is half the length of the preceding length; and instructions templates without the vector length field 1059B operate on the maximum vector length. Further, in one embodiment, the class B instruction templates of the specific vector friendly instruction format 1100 operate on packed or scalar single/double-precision floating point data and packed or scalar integer data. Scalar operations are operations performed on the lowest order data element position in an zmm/ymm/xmm register; the higher order data element positions are either left the same as they were prior to the instruction or zeroed depending on the embodiment.

Write mask registers 1215—in the embodiment illustrated, there are 8 write mask registers (k0 through k7), each 64 bits in size. In an alternate embodiment, the write mask registers 1215 are 16 bits in size. As previously described, in some embodiments, the vector mask register k0 cannot be used as a write mask; when the encoding that would normally indicate k0 is used for a write mask, it selects a hardwired write mask of 0xffff, effectively disabling write masking for that instruction.

General-purpose registers 1225—in the embodiment illustrated, there are sixteen 64-bit general-purpose registers that are used along with the existing x86 addressing modes to address memory operands. These registers are referenced by the names RAX, RBX, RCX, RDX, RBP, RSI, RDI, RSP, and R8 through R15.

Scalar floating point stack register file (x87 stack) 1245, on which is aliased the MMX packed integer flat register file 1250—in the embodiment illustrated, the x87 stack is an eight-element stack used to perform scalar floating-point operations on 32/64/80-bit floating point data using the x87 instruction set extension; while the MMX registers are used to perform operations on 64-bit packed integer data, as well as to hold operands for some operations performed between the MMX and XMM registers.

Alternative embodiments may use wider or narrower registers. Additionally, alternative embodiments may use more, less, or different register files and registers.

Exemplary Core Architectures, Processors, and Computer Architectures

Processor cores may be implemented in different ways, for different purposes, and in different processors. For instance, implementations of such cores may include: 1) a general purpose in-order core intended for general-purpose computing; 2) a high performance general purpose out-of-order core intended for general-purpose computing; 3) a special purpose core intended primarily for graphics and/or scientific (throughput) computing. Implementations of different processors may include: 1) a CPU including one or more general purpose in-order cores intended for general-purpose computing and/or one or more general purpose out-of-order cores intended for general-purpose computing; and 2) a coprocessor including one or more special purpose cores intended primarily for graphics and/or scientific (throughput). Such different processors lead to different computer system architectures, which may include: 1) the coprocessor on a separate chip from the CPU; 2) the coprocessor on a separate die in the same package as a CPU; 3) the coprocessor on the same die as a CPU (in which case, such a coprocessor is sometimes referred to as special purpose logic, such as integrated graphics and/or scientific (throughput) logic, or as special purpose cores); and 4) a system on a chip that may include on the same die the described CPU (sometimes referred to as the application core(s) or application processor(s)), the above described coprocessor, and additional functionality. Exemplary core architectures are described next, followed by descriptions of exemplary processors and computer architectures.

Exemplary Core Architectures
In-Order and Out-of-Order Core Block Diagram

FIG. 13A is a block diagram illustrating both an exemplary in-order pipeline and an exemplary register renaming, out-of-order issue/execution pipeline according to some embodiments of the invention. FIG. 13B is a block diagram illustrating both an exemplary embodiment of an in-order architecture core and an exemplary register renaming, out-of-order issue/execution architecture core to be included in a processor according to some embodiments of the invention. The solid lined boxes in FIGS. 13A-B illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 13A, a processor pipeline 1300 includes a fetch stage 1302, a length decode stage 1304, a decode stage 1306, an allocation stage 1308, a renaming stage 1310, a scheduling (also known as a dispatch or issue) stage 1312, a register read/memory read stage 1314, an execute stage 1316, a write back/memory write stage 1318, an exception handling stage 1322, and a commit stage 1324.

FIG. 13B shows processor core 1390 including a front end unit 1330 coupled to an execution engine unit 1350, and both are coupled to a memory unit 1370. The core 1390 may be a reduced instruction set computing (RISC) core, a complex instruction set computing (CISC) core, a very long instruction word (VLIW) core, or a hybrid or alternative core type. As yet another option, the core 1390 may be a special-purpose core, such as, for example, a network or communication core, compression engine, coprocessor core, general purpose computing graphics processing unit (GPGPU) core, graphics core, or the like.

The front end unit 1330 includes a branch prediction unit 1332 coupled to an instruction cache unit 1334, which is coupled to an instruction translation lookaside buffer (TLB) 1336, which is coupled to an instruction fetch unit 1338, which is coupled to a decode unit 1340. The decode unit 1340 (or decoder) may decode instructions, and generate as an output one or more micro-operations, micro-code entry points, microinstructions, other instructions, or other control signals, which are decoded from, or which otherwise reflect, or are derived from, the original instructions. The decode unit 1340 may be implemented using various different mechanisms. Examples of suitable mechanisms include, but are not limited to, look-up tables, hardware implementations, programmable logic arrays (PLAs), microcode read only memories (ROMs), etc. In one embodiment, the core 1390 includes a microcode ROM or other medium that stores microcode for certain macroinstructions (e.g., in decode unit 1340 or otherwise within the front end unit 1330). The decode unit 1340 is coupled to a rename/allocator unit 1352 in the execution engine unit 1350.

The execution engine unit 1350 includes the rename/allocator unit 1352 coupled to a retirement unit 1354 and a set of one or more scheduler unit(s) 1356. The scheduler unit(s) 1356 represents any number of different schedulers, including reservations stations, central instruction window, etc. The scheduler unit(s) 1356 is coupled to the physical register file(s) unit(s) 1358. Each of the physical register file(s) units 1358 represents one or more physical register files, different ones of which store one or more different data types, such as scalar integer, scalar floating point, packed integer, packed floating point, vector integer, vector floating point, status (e.g., an instruction pointer that is the address of the next instruction to be executed), etc. In one embodiment, the physical register file(s) unit 1358 comprises a vector registers unit, a write mask registers unit, and a scalar registers unit. These register units may provide architectural vector registers, vector mask registers, and general purpose registers. The physical register file(s) unit(s) 1358 is overlapped by the retirement unit 1354 to illustrate various ways in which register renaming and out-of-order execution may be implemented (e.g., using a reorder buffer(s) and a retirement register file(s); using a future file(s), a history buffer(s), and a retirement register file(s); using a register maps and a pool of registers; etc.). The retirement unit 1354 and the physical register file(s) unit(s) 1358 are coupled to the execution cluster(s) 1360. The execution cluster(s) 1360 includes a set of one or more execution units 1362 and a set of one or more memory access units 1364. The execution units 1362 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions. The scheduler unit(s) 1356, physical register file(s) unit(s) 1358, and execution cluster(s) 1360 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 1364). It should also be understood that where separate pipelines are used, one or more of these pipelines may be out-of-order issue/execution and the rest in-order.

The set of memory access units 1364 is coupled to the memory unit 1370, which includes a data TLB unit 1372 coupled to a data cache unit 1374 coupled to a level 2 (L2) cache unit 1376. In one exemplary embodiment, the memory access units 1364 may include a load unit, a store address unit, and a store data unit, each of which is coupled to the data TLB unit 1372 in the memory unit 1370. The instruction cache unit 1334 is further coupled to a level 2 (L2) cache unit 1376 in the memory unit 1370. The L2 cache unit 1376 is coupled to one or more other levels of cache and eventually to a main memory.

By way of example, the exemplary register renaming, out-of-order issue/execution core architecture may implement the pipeline 1300 as follows: 1) the instruction fetch 1338 performs the fetch and length decoding stages 1302 and 1304; 2) the decode unit 1340 performs the decode stage 1306; 3) the rename/allocator unit 1352 performs the allocation stage 1308 and renaming stage 1310; 4) the scheduler unit(s) 1356 performs the schedule stage 1312; 5) the physical register file(s) unit(s) 1358 and the memory unit 1370 perform the register read/memory read stage 1314; the execution cluster 1360 perform the execute stage 1316; 6) the memory unit 1370 and the physical register file(s) unit(s) 1358 perform the write back/memory write stage 1318; 7) various units may be involved in the exception handling stage 1322; and 8) the retirement unit 1354 and the physical register file(s) unit(s) 1358 perform the commit stage 1324.

The core 1390 may support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.), including the instruction(s) described herein. In one embodiment, the core 1390 includes logic to support a packed data instruction set extension (e.g., AVX1, AVX2), thereby allowing the operations used by many multimedia applications to be performed using packed data.

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes separate instruction and data cache units 1334/1374 and a shared L2 cache unit 1376, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Specific Exemplary in-Order Core Architecture

Figure 14B:
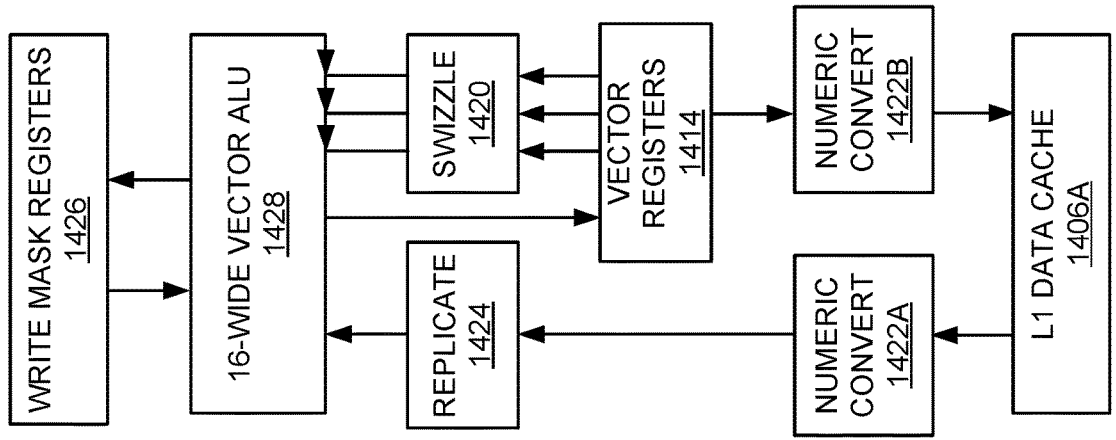
FIGS. 14A-B illustrate a block diagram of a more specific exemplary in-order core architecture, which core would be one of several logic blocks (including other cores of the same type and/or different types) in a chip.
Figure 14A:
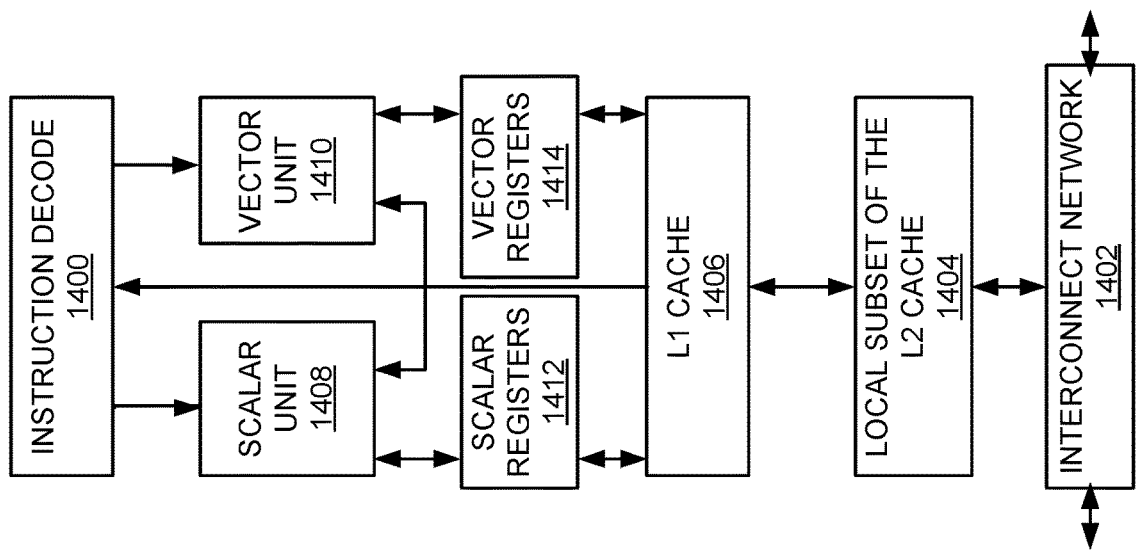

FIGS. 14A-B illustrate a block diagram of a more specific exemplary in-order core architecture, which core would be one of several logic blocks (including other cores of the same type and/or different types) in a chip. The logic blocks communicate through a high-bandwidth interconnect network (e.g., a ring network) with some fixed function logic, memory I/O interfaces, and other necessary I/O logic, depending on the application.

FIG. 14A is a block diagram of a single processor core, along with its connection to the on-die interconnect network and with its local subset of the Level 2 (L2) cache, according to some embodiments of the invention. In one embodiment, an instruction decoder 1400 supports the x86 instruction set with a packed data instruction set extension. An L1 cache 1406 allows low-latency accesses to cache memory into the scalar and vector units. While in one embodiment (to simplify the design), a scalar unit 1408 and a vector unit 1410 use separate register sets (respectively, scalar registers 1412 and vector registers 1414) and data transferred between them is written to memory and then read back in from a level 1 (L1) cache 1406, alternative embodiments of the invention may use a different approach (e.g., use a single register set or include a communication path that allow data to be transferred between the two register files without being written and read back).

The local subset of the L2 cache 1404 is part of a global L2 cache that is divided into separate local subsets, one per processor core. Each processor core has a direct access path to its own local subset of the L2 cache 1404. Data read by a processor core is stored in its L2 cache subset 1404 and can be accessed quickly, in parallel with other processor cores accessing their own local L2 cache subsets. Data written by a processor core is stored in its own L2 cache subset 1404 and is flushed from other subsets, if necessary. The ring network ensures coherency for shared data. The ring network is bi-directional to allow agents such as processor cores, L2 caches and other logic blocks to communicate with each other within the chip. Each ring data-path is 1012-bits wide per direction.

FIG. 14B is an expanded view of part of the processor core in FIG. 14A according to some embodiments of the invention. FIG. 14B includes an L1 data cache 1406A part of the L1 cache 1404, as well as more detail regarding the vector unit 1410 and the vector registers 1414. Specifically, the vector unit 1410 is a 16-wide vector processing unit (VPU) (see the 16-wide ALU 1428), which executes one or more of integer, single-precision float, and double-precision float instructions. The VPU supports swizzling the register inputs with swizzle unit 1420, numeric conversion with numeric convert units 1422A-B, and replication with replication unit 1424 on the memory input. Write mask registers 1426 allow predicating resulting vector writes.

Figure 15:
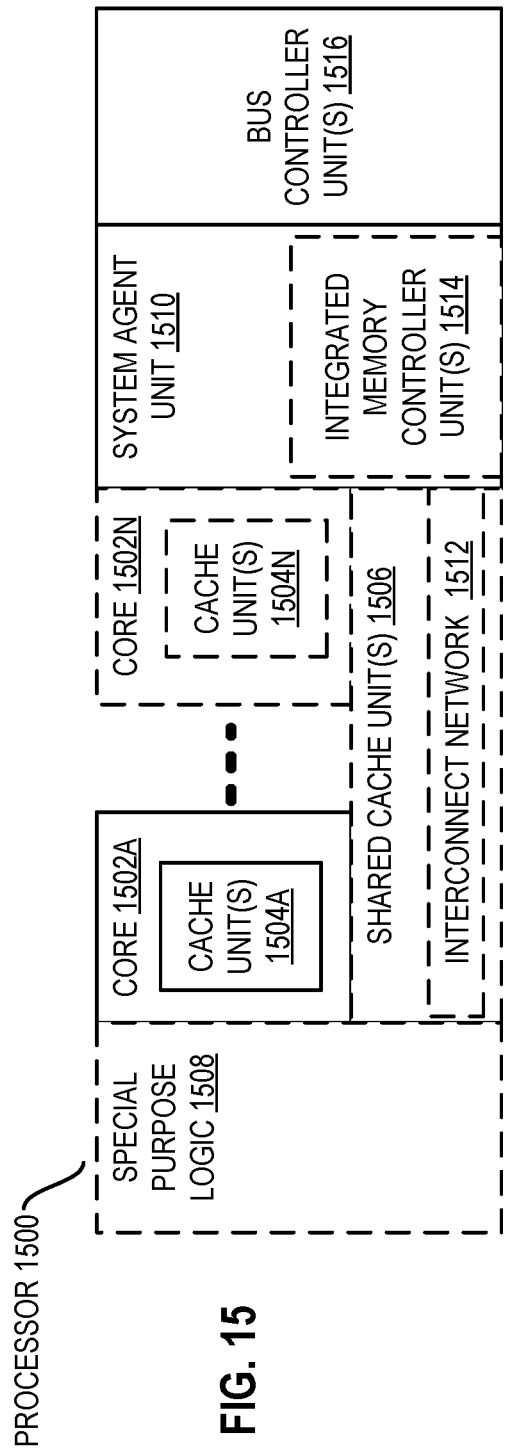
FIG. 15 is a block diagram of a processor that may have more than one core, may have an integrated memory controller, and may have integrated graphics according to some embodiments.

FIG. 15 is a block diagram of a processor that may have more than one core, may have an integrated memory controller, and may have integrated graphics according to some embodiments of the invention. The solid lined boxes in FIG. 15 illustrate a processor 1500 with a single core 1502A, a system agent 1510, a set of one or more bus controller units 1516, while the optional addition of the dashed lined boxes illustrates an alternative processor 1500 with multiple cores 1502A-N, a set of one or more integrated memory controller unit(s) 1514 in the system agent unit 1510, and special purpose logic 1508.

Thus, different implementations of the processor 1500 may include: 1) a CPU with the special purpose logic 1508 being integrated graphics and/or scientific (throughput) logic (which may include one or more cores), and the cores 1502A-N being one or more general purpose cores (e.g., general purpose in-order cores, general purpose out-of-order cores, a combination of the two); 2) a coprocessor with the cores 1502A-N being a large number of special purpose cores intended primarily for graphics and/or scientific (throughput); and 3) a coprocessor with the cores 1502A-N being a large number of general purpose in-order cores. Thus, the processor 1500 may be a general-purpose processor, coprocessor or special-purpose processor, such as, for example, a network or communication processor, compression engine, graphics processor, GPGPU (general purpose graphics processing unit), a high-throughput many integrated core (MIC) coprocessor (including 30 or more cores), embedded processor, or the like. The processor may be implemented on one or more chips. The processor 1500 may be a part of and/or may be implemented on one or more substrates using any of a number of process technologies, such as, for example, BiCMOS, CMOS, or NMOS.

The memory hierarchy includes one or more levels of cache within the cores, a set or one or more shared cache units 1506, and external memory (not shown) coupled to the set of integrated memory controller units 1514. The set of shared cache units 1506 may include one or more mid-level caches, such as level 2 (L2), level 3 (L3), level 4 (L4), or other levels of cache, a last level cache (LLC), and/or combinations thereof. While in one embodiment a ring based interconnect unit 1512 interconnects the integrated graphics logic 1508 (integrated graphics logic 1508 is an example of and is also referred to herein as special purpose logic), the set of shared cache units 1506, and the system agent unit 1510/integrated memory controller unit(s) 1514, alternative embodiments may use any number of well-known techniques for interconnecting such units. In one embodiment, coherency is maintained between one or more cache units 1506 and cores 1502-A-N.

In some embodiments, one or more of the cores 1502A-N are capable of multithreading. The system agent 1510 includes those components coordinating and operating cores 1502A-N. The system agent unit 1510 may include for example a power control unit (PCU) and a display unit. The PCU may be or include logic and components needed for regulating the power state of the cores 1502A-N and the integrated graphics logic 1508. The display unit is for driving one or more externally connected displays.

The cores 1502A-N may be homogenous or heterogeneous in terms of architecture instruction set; that is, two or more of the cores 1502A-N may be capable of execution the same instruction set, while others may be capable of executing only a subset of that instruction set or a different instruction set.

Exemplary Computer Architectures

FIGS. 16-19 are block diagrams of exemplary computer architectures. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Figure 16:
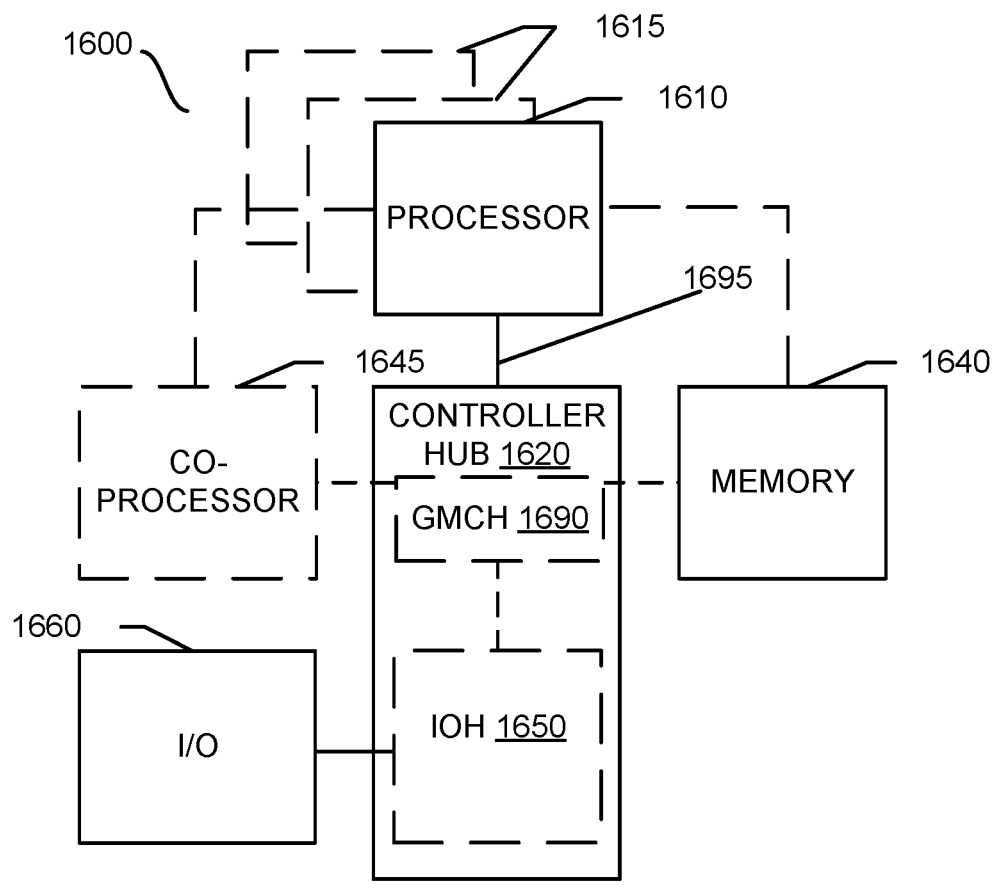
FIGS. 16-19 are block diagrams of exemplary computer architectures.

Referring now to FIG. 16, shown is a block diagram of a system 1600 in accordance with one embodiment of the present invention. The system 1600 may include one or more processors 1610, 1615, which are coupled to a controller hub 1620. In one embodiment the controller hub 1620 includes a graphics memory controller hub (GMCH) 1690 and an Input/Output Hub (IOH) 1650 (which may be on separate chips); the GMCH 1690 includes memory and graphics controllers to which are coupled memory 1640 and a coprocessor 1645; the IOH 1650 couples input/output (I/O) devices 1660 to the GMCH 1690. Alternatively, one or both of the memory and graphics controllers are integrated within the processor (as described herein), the memory 1640 and the coprocessor 1645 are coupled directly to the processor 1610, and the controller hub 1620 in a single chip with the IOH 1650.

The optional nature of additional processors 1615 is denoted in FIG. 16 with broken lines. Each processor 1610, 1615 may include one or more of the processing cores described herein and may be some version of the processor 1500.

The memory 1640 may be, for example, dynamic random access memory (DRAM), phase change memory (PCM), or a combination of the two. For at least one embodiment, the controller hub 1620 communicates with the processor(s) 1610, 1615 via a multi-drop bus, such as a frontside bus (FSB), point-to-point interface such as QuickPath Interconnect (QPI), or similar connection 1695.

In one embodiment, the coprocessor 1645 is a special-purpose processor, such as, for example, a high-throughput MIC processor, a network or communication processor, compression engine, graphics processor, GPGPU, embedded processor, or the like. In one embodiment, controller hub 1620 may include an integrated graphics accelerator.

There can be a variety of differences between the physical resources 1610, 1615 in terms of a spectrum of metrics of merit including architectural, microarchitectural, thermal, power consumption characteristics, and the like.

In one embodiment, the processor 1610 executes instructions that control data processing operations of a general type. Embedded within the instructions may be coprocessor instructions. The processor 1610 recognizes these coprocessor instructions as being of a type that should be executed by the attached coprocessor 1645. Accordingly, the processor 1610 issues these coprocessor instructions (or control signals representing coprocessor instructions) on a coprocessor bus or other interconnect, to coprocessor 1645. Coprocessor(s) 1645 accept and execute the received coprocessor instructions.

Figure 17:
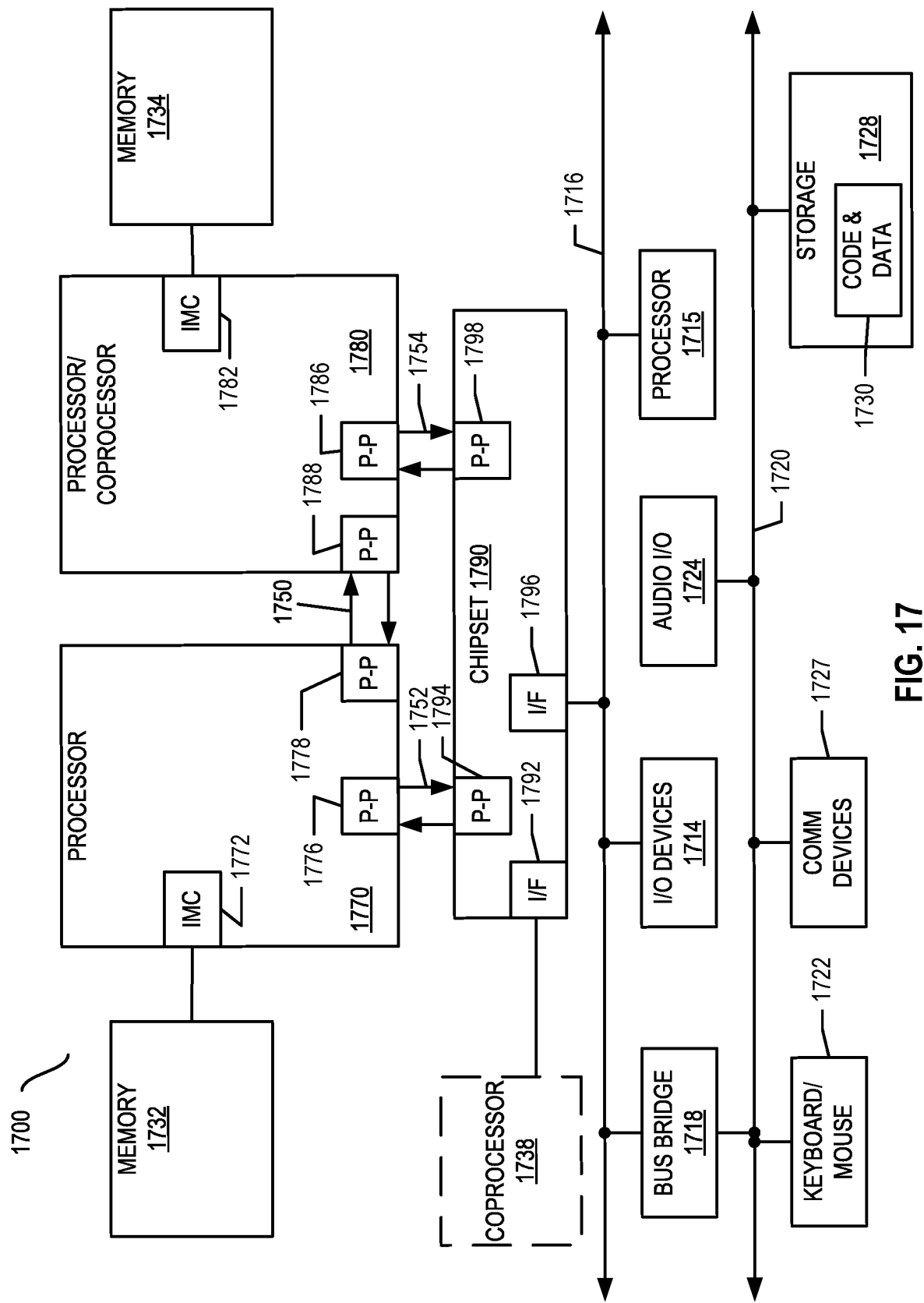

Referring now to FIG. 17, shown is a block diagram of a first more specific exemplary system 1700 in accordance with an embodiment of the present invention. As shown in FIG. 17, multiprocessor system 1700 is a point-to-point interconnect system, and includes a first processor 1770 and a second processor 1780 coupled via a point-to-point interconnect 1750. Each of processors 1770 and 1780 may be some version of the processor 1500. In some embodiments, processors 1770 and 1780 are respectively processors 1610 and 1615, while coprocessor 1738 is coprocessor 1645. In another embodiment, processors 1770 and 1780 are respectively processor 1610 coprocessor 1645.

Processors 1770 and 1780 are shown including integrated memory controller (IMC) units 1772 and 1782, respectively. Processor 1770 also includes as part of its bus controller units point-to-point (P-P) interfaces 1776 and 1778; similarly, second processor 1780 includes P-P interfaces 1786 and 1788. Processors 1770, 1780 may exchange information via a point-to-point (P-P) interface 1750 using P-P interface circuits 1778, 1788. As shown in FIG. 17, IMCs 1772 and 1782 couple the processors to respective memories, namely a memory 1732 and a memory 1734, which may be portions of main memory locally attached to the respective processors.

Processors 1770, 1780 may each exchange information with a chipset 1790 via individual P-P interfaces 1752, 1754 using point to point interface circuits 1776, 1794, 1786, 1798. Chipset 1790 may optionally exchange information with the coprocessor 1738 via a high-performance interface 1792. In one embodiment, the coprocessor 1738 is a special-purpose processor, such as, for example, a high-throughput MIC processor, a network or communication processor, compression engine, graphics processor, GPGPU, embedded processor, or the like.

A shared cache (not shown) may be included in either processor or outside of both processors yet connected with the processors via P-P interconnect, such that either or both processors' local cache information may be stored in the shared cache if a processor is placed into a low power mode.

Chipset 1790 may be coupled to a first bus 1716 via an interface 1796. In one embodiment, first bus 1716 may be a Peripheral Component Interconnect (PCI) bus, or a bus such as a PCI Express bus or another third generation I/O interconnect bus, although the scope of the present invention is not so limited.

As shown in FIG. 17, various I/O devices 1714 may be coupled to first bus 1716, along with a bus bridge 1718 which couples first bus 1716 to a second bus 1720. In one embodiment, one or more additional processor(s) 1715, such as coprocessors, high-throughput MIC processors, GPGPU's, accelerators (such as, e.g., graphics accelerators or digital signal processing (DSP) units), field programmable gate arrays, or any other processor, are coupled to first bus 1716. In one embodiment, second bus 1720 may be a low pin count (LPC) bus. Various devices may be coupled to a second bus 1720 including, for example, a keyboard and/or mouse 1722, communication devices 1727 and a storage unit 1728 such as a disk drive or other mass storage device which may include instructions/code and data 1730, in one embodiment. Further, an audio I/O 1724 may be coupled to the second bus 1720. Note that other architectures are possible. For example, instead of the point-to-point architecture of FIG. 17, a system may implement a multi-drop bus or other such architecture.

Figure 18:
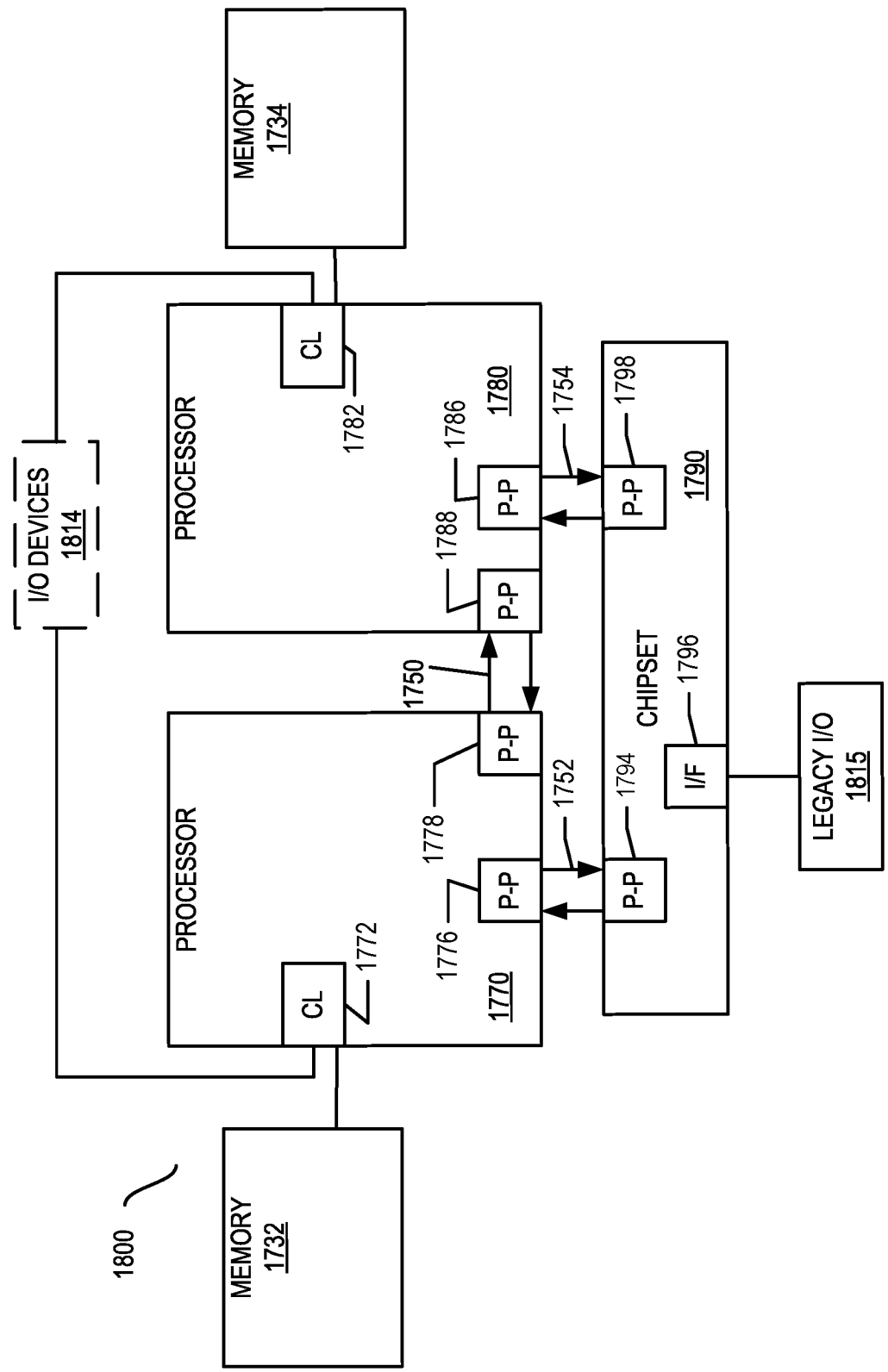

Referring now to FIG. 18, shown is a block diagram of a second more specific exemplary system 1800 in accordance with an embodiment of the present invention. Like elements in FIGS. 17 and 18 bear like reference numerals, and certain aspects of FIG. 17 have been omitted from FIG. 18 in order to avoid obscuring other aspects of FIG. 18.

FIG. 18 illustrates that the processors 1770, 1780 may include integrated memory and I/O control logic ("CL") 1772 and 1782, respectively. Thus, the CL 1772, 1782 include integrated memory controller units and include I/O control logic. FIG. 18 illustrates that not only are the memories 1732, 1734 coupled to the CL 1772, 1782, but also that I/O devices 1814 are also coupled to the control logic 1772, 1782. Legacy I/O devices 1815 are coupled to the chipset 1790.

Figure 19:
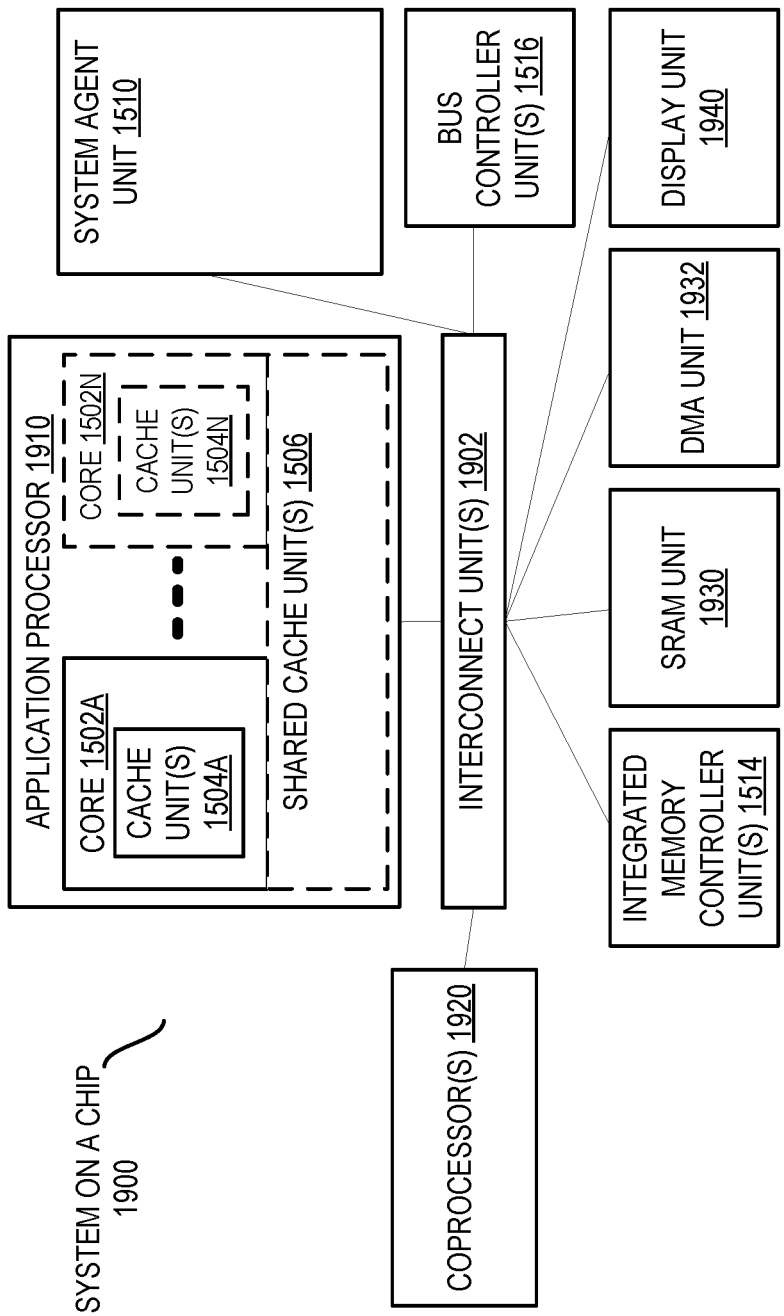

Referring now to FIG. 19, shown is a block diagram of a SoC 1900 in accordance with an embodiment of the present invention. Similar elements in FIG. 15 bear like reference numerals. Also, dashed lined boxes are optional features on more advanced SoCs. In FIG. 19, an interconnect unit(s) 1902 is coupled to: an application processor 1910 which includes a set of one or more cores 1502A-N, which include cache units 1504A-N, and shared cache unit(s) 1506; a system agent unit 1510; a bus controller unit(s) 1516; an integrated memory controller unit(s) 1514; a set or one or more coprocessors 1920 which may include integrated graphics logic, an image processor, an audio processor, and a video processor; an static random access memory (SRAM) unit 1930; a direct memory access (DMA) unit 1932; and a display unit 1940 for coupling to one or more external displays. In one embodiment, the coprocessor(s) 1920 include a special-purpose processor, such as, for example, a network or communication processor, compression engine, GPGPU, a high-throughput MIC processor, embedded processor, or the like.

Embodiments of the mechanisms disclosed herein may be implemented in hardware, software, firmware, or a combination of such implementation approaches. Embodiments of the invention may be implemented as computer programs or program code executing on programmable systems comprising at least one processor, a storage system (including volatile and non-volatile memory and/or storage elements), at least one input device, and at least one output device.

Program code, such as code 1730 illustrated in FIG. 17, may be applied to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritable's (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of the invention also include non-transitory, tangible machine-readable media containing instructions or containing design data, such as Hardware Description Language (HDL), which defines structures, circuits, apparatuses, processors and/or system features described herein. Such embodiments may also be referred to as program products.

Emulation (Including Binary Translation, Code Morphing, Etc.)

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

FIG. 20 is a block diagram contrasting the use of a software instruction converter to convert binary instructions in a source instruction set to binary instructions in a target instruction set according to some embodiments of the invention. In the illustrated embodiment, the instruction converter is a software instruction converter, although alternatively the instruction converter may be implemented in software, firmware, hardware, or various combinations thereof. FIG. 20 shows a program in a high level language 2002 may be compiled using an x86 compiler 2004 to generate x86 binary code 2006 that may be natively executed by a processor with at least one x86 instruction set core 2016. The processor with at least one x86 instruction set core 2016 represents any processor that can perform substantially the same functions as an Intel processor with at least one x86 instruction set core by compatibly executing or otherwise processing (1) a substantial portion of the instruction set of the Intel x86 instruction set core or (2) object code versions of applications or other software targeted to run on an Intel processor with at least one x86 instruction set core, in order to achieve substantially the same result as an Intel processor with at least one x86 instruction set core. The x86 compiler 2004 represents a compiler that is operable to generate x86 binary code 2006 (e.g., object code) that can, with or without additional linkage processing, be executed on the processor with at least one x86 instruction set core 2016. Similarly, FIG. 20 shows the program in the high level language 2002 may be compiled using an alternative instruction set compiler 2008 to generate alternative instruction set binary code 2010 that may be natively executed by a processor without at least one x86 instruction set core 2014 (e.g., a processor with cores that execute the MIPS instruction set of MIPS Technologies of Sunnyvale, Calif. and/or that execute the ARM instruction set of ARM Holdings of Sunnyvale, Calif.). The instruction converter 2012 is used to convert the x86 binary code 2006 into code that may be natively executed by the processor without an x86 instruction set core 2014. This converted code is not likely to be the same as the alternative instruction set binary code 2010 because an instruction converter capable of this is difficult to make; however, the converted code will accomplish the general operation and be made up of instructions from the alternative instruction set. Thus, the instruction converter 2012 represents software, firmware, hardware, or a combination thereof that, through emulation, simulation or any other process, allows a processor or other electronic device that does not have an x86 instruction set processor or core to execute the x86 binary code 2006.

Further Examples

Example 1 provides an exemplary apparatus comprising: fetch circuitry to fetch a cipher instruction specifying an opcode, a datum, and a key, the opcode to specify one of three cryptographic modes and an operation, decode circuitry to decode the fetched cipher instruction; and execution circuitry, responsive to the decoded cipher instruction, to perform the operation using a selected one of three block ciphers corresponding to the specified cryptographic mode and a unified cipher datapath shared by the three block ciphers, the unified cipher datapath comprising a plurality of hybrid substitution boxes (Sboxes) to perform Galois Field (GF) multiplications and inverse computations, wherein the unified cipher datapath is to calculate an eighth-order polynomial isomorphically equivalent to each polynomial used by the three block ciphers, the eighth-order polynomial being implemented by calculating and then combining two fourth-order polynomials.

Example 2 includes the substance of the exemplary apparatus of Example 1, wherein the execution circuitry comprises a cipher accelerator, wherein the unified cipher datapath comprises eight hybrid Sboxes, and wherein the cipher accelerator further comprises a 128-bit register to hold the specified datum, and two 128-bit registers, one of the two 128-bit registers to be used to hold the specified key, and the other 128-bit register to be used to hold an auxiliary key in *Camellia* mode, and a next-round key in AES mode.

Example 3 includes the substance of the exemplary apparatus of Example 1, wherein the first cryptographic mode uses an Advanced Encryption Standard (AES) algorithm, wherein the unified cipher datapath comprises eight Sboxes, and wherein the first block cipher is to use the unified cipher datapath to operate at a throughput of 2.5 cycles per round.

Example 4 includes the substance of the exemplary apparatus of Example 1, wherein the second cryptographic mode uses a SMS4 algorithm, wherein the unified cipher datapath comprises eight Sboxes, and wherein the second block cipher is to use four of the eight Sboxes of the unified cipher datapath for round computation, and the other four Sboxes for key expansion, wherein the second block cipher is to use the unified cipher datapath to operate at a throughput of one cycle per round.

Example 5 includes the substance of the exemplary apparatus of Example 1, wherein the third cryptographic mode uses a *Camellia* (CML) algorithm, wherein the unified cipher datapath comprises eight Sboxes, and wherein the third block cipher is to use the unified cipher datapath to operate at a throughput of 1.3 cycles per round.

Example 6 includes the substance of the exemplary apparatus of Example 1, wherein the execution circuitry comprises a cipher accelerator, wherein the unified cipher datapath comprises eight Sboxes, each of which provides an Sbox output (1×) and a scaled Sbox output (2×), wherein the first, second, and third cryptographic modes use Advanced Encryption Standard (AES), SMS4, and *Camellia* (CML) algorithms, respectively, and wherein the cipher accelerator attempts to balance a critical path delay across all three cryptographic modes by eliminating multiplication from the AES mode when performing scaling in the first block, and instead adding the Sbox output (1×) and the scaled Sbox output (2×) to generate a required scaled output (3×).

Example 7 includes the substance of the exemplary apparatus of Example 1, wherein the execution circuitry comprises a cipher accelerator, wherein the first, second, and third cryptographic modes use Advanced Encryption Standard (AES), SMS4, and *Camellia* (CML) algorithms, respectively, and wherein the cipher accelerator is further to enable inversion sharing by translating operands from AES-specific, SMS4-specific, and CML-specific reduction polynomials to a unique, composite field.

Example 8 includes the substance of the exemplary apparatus of Example 1, wherein the execution circuitry comprises a cipher accelerator, wherein the third cryptographic mode uses a *Camellia* (CML) algorithm, wherein the cipher accelerator is further to include separate circuitry to perform two intra-Feistel CML shuffle functions (FL/FL-1), and wherein the third cipher block is to use the separate circuitry when operating.

Example 9 includes the substance of the exemplary apparatus of Example 1, wherein the opcode is to select the cryptographic mode and to indicate whether to encrypt or decrypt, and wherein the cipher instruction is further to specify a key length and a number of rounds, the key length being one of 128, 192, and 256 bits, and the number of rounds being one of 1, 10, 12, 14, 18, 24, and 32.

Example 10 includes the substance of the exemplary apparatus of Example 1, wherein the apparatus is one of a processor, a processor core, a network processor, a mobile processor, and a web server.

Example 11 provides an exemplary method performed by a computing apparatus, the method comprising: fetching, using fetch circuitry, a cipher instruction specifying a datum, a key, and an opcode to specify one of three cryptographic modes and an operation, decoding, using decode circuitry, the fetched cipher instruction; and responsive to the decoded cipher instruction, performing the specified operation with execution circuitry using a selected one of three block ciphers corresponding to the specified cryptographic mode and a unified cipher datapath shared by the three block ciphers, the unified cipher datapath comprising a plurality of hybrid substitution boxes (Sboxes) to perform Galois Field (GF) multiplications and inverse computations, wherein the unified cipher datapath is to calculate an eighth-order polynomial isomorphically equivalent to each polynomial used by the three block ciphers, the eighth-order polynomial being implemented by calculating and then combining two fourth-order polynomials.

Example 12 includes the substance of the exemplary method of Example 11, wherein the execution circuitry comprises a cipher accelerator, wherein the unified cipher datapath comprises eight hybrid Sboxes, and wherein the cipher accelerator further comprises a 128-bit register to hold the specified datum, and two 128-bit registers, one of the two 128-bit registers to be used to hold the specified key, and the other 128-bit register to be used to hold an auxiliary key in *Camellia* mode, and a next-round key in AES mode.

Example 13 includes the substance of the exemplary method of Example 11, wherein a first cryptographic mode of the three specified cryptographic modes uses an Advanced Encryption Standard (AES) algorithm, wherein the unified cipher datapath comprises eight Sboxes, and wherein the first block cipher is to use the unified cipher datapath to operate at a throughput of 2.5 cycles per round.

Example 14 includes the substance of the exemplary method of Example 11, wherein a second cryptographic mode of the three specified cryptographic modes uses a SMS4 algorithm, wherein the unified cipher datapath comprises eight Sboxes, and wherein the second block cipher is to use four of the eight Sboxes of the unified cipher datapath for round computation, and the other four Sboxes for key expansion, wherein the second block cipher is to use the unified cipher datapath to operate at a throughput of one cycle per round.

Example 15 includes the substance of the exemplary method of Example 11, wherein a third cryptographic mode of the three specified cryptographic modes uses a *Camellia* (CML) algorithm, wherein the unified cipher datapath comprises eight Sboxes, and wherein the third block cipher is to use the unified cipher datapath to operate at a throughput of 1.3 cycles per round.

Example 16 includes the substance of the exemplary method of Example 11, wherein the execution circuitry comprises a cipher accelerator, wherein the unified cipher datapath comprises eight Sboxes, each of which provides an Sbox output (1×) and a scaled Sbox output (2×), wherein the first, second, and third cryptographic modes use Advanced Encryption Standard (AES), SMS4, and *Camellia* (CML) algorithms, respectively, and wherein the cipher accelerator attempts to balance a critical path delay across all three cryptographic modes by eliminating multiplication from the AES mode when performing scaling in the first block, and instead adding the Sbox output (1×) and the scaled Sbox output (2×) to generate a required scaled output (3×).

Example 17 includes the substance of the exemplary method of Example 11, wherein the execution circuitry comprises a cipher accelerator, wherein the first, second, and third cryptographic modes use Advanced Encryption Standard (AES), SMS4, and *Camellia* (CML) algorithms, respectively, and wherein the cipher accelerator is further to enable inversion sharing by translating operands from AES-specific, SMS4-specific, and CML-specific reduction polynomials to a unique, composite field.

Example 18 includes the substance of the exemplary method of Example 11, wherein the execution circuitry comprises a cipher accelerator, wherein the third cryptographic mode uses a *Camellia* (CML) algorithm, wherein the cipher accelerator is further to include separate circuitry to perform two intra-Feistel CML shuffle functions (FL/FL-1), and wherein the third cipher block is to use the separate circuitry when operating.

Example 19 includes the substance of the exemplary method of Example 11, wherein the opcode is to select the cryptographic mode and to indicate whether to encrypt or decrypt, and wherein the cipher instruction is further to specify a key length and a number of rounds, the key length being one of 128, 192, and 256 bits, and the number of rounds being one of 1, 10, 12, 14, 18, 24, and 32.

Example 20 includes the substance of the exemplary method of Example 11, wherein the computing apparatus is one of a processor, a processor core, a network processor, a mobile processor, and a web server.

Example 21 provides an exemplary non-transitory machine-readable medium containing instructions, when executed be a processor, to cause the processor to respond to an instruction by: fetching, using fetch circuitry, a cipher instruction specifying a datum, a key, and an opcode to specify one of three cryptographic modes and an operation, decoding, using decode circuitry, the fetched cipher instruction; and responsive to the decoded cipher instruction, performing the specified operation with execution circuitry using a selected one of three block ciphers corresponding to the specified cryptographic mode and a unified cipher datapath shared by the three block ciphers, the unified cipher datapath comprising a plurality of hybrid substitution boxes (Sboxes) to perform Galois Field (GF) multiplications and inverse computations, wherein the unified cipher datapath is to calculate an eighth-order polynomial isomorphically equivalent to each polynomial used by the three block ciphers, the eighth-order polynomial being implemented by calculating and then combining two fourth-order polynomials.

Example 22 includes the substance of the exemplary non-transitory machine-readable medium of Example 21, wherein the execution circuitry comprises a cipher accelerator, wherein the unified cipher datapath comprises eight hybrid Sboxes, and wherein the cipher accelerator further comprises a 128-bit register to hold the specified datum, and two 128-bit registers, one of the two 128-bit registers to be used to hold the specified key, and the other 128-bit register to be used to hold an auxiliary key in *Camellia* mode, and a next-round key in AES mode.

Example 23 includes the substance of the exemplary non-transitory machine-readable medium of Example 21, wherein a first cryptographic mode of the three specified cryptographic modes uses an Advanced Encryption Standard (AES) algorithm, wherein the unified cipher datapath comprises eight Sboxes, and wherein the first block cipher is to use the unified cipher datapath to operate at a throughput of 2.5 cycles per round.

Example 24 includes the substance of the exemplary non-transitory machine-readable medium of Example 21, wherein a second cryptographic mode of the three specified cryptographic modes uses a SMS4 algorithm, wherein the unified cipher datapath comprises eight Sboxes, and wherein the second block cipher is to use four of the eight Sboxes of the unified cipher datapath for round computation, and the other four Sboxes for key expansion, wherein the second block cipher is to use the unified cipher datapath to operate at a throughput of one cycle per round.

Example 25 includes the substance of the exemplary non-transitory machine-readable medium of Example 21, wherein a third cryptographic mode of the three specified cryptographic modes uses a *Camellia* (CML) algorithm, wherein the unified cipher datapath comprises eight Sboxes, and wherein the third block cipher is to use the unified cipher datapath to operate at a throughput of 1.3 cycles per round.

What is claimed is:

1. An apparatus comprising:
    fetch circuitry to fetch a cipher instruction specifying an opcode, a datum, and a key, the opcode to specify a first cryptographic mode or a second cryptographic mode and an operation;
    decode circuitry to decode the fetched cipher instruction; and
    execution circuitry, responsive to the decoded cipher instruction, to:
        in response to the opcode specifying the first cryptographic mode, configure a unified cipher datapath to the first cryptographic mode for first block cipher corresponding to the first cryptographic mode, and perform the operation using the unified cipher datapath configured in the first cryptographic mode, and
        in response to the opcode specifying the second cryptographic mode, configure the unified cipher datapath to the second cryptographic mode for a second block cipher corresponding to the second cryptographic mode and different than the first block cipher, and perform the operation using the unified cipher datapath configured in the second cryptographic mode, wherein the unified cipher datapath comprises a plurality of hybrid substitution boxes (Sboxes) to perform Galois Field (GF) multiplications and inverse computations.

2. The apparatus of claim 1, wherein the execution circuitry comprises a cipher accelerator including the unified cipher datapath, wherein the unified cipher datapath comprises eight hybrid Sboxes, and wherein the cipher accelerator further comprises a 128-bit register to hold the specified datum, and two 128-bit registers, one of the two 128-bit registers to be used to hold the specified key, and the other 128-bit register to be used to hold an auxiliary key when the first cryptographic mode is a *Camellia* mode, and a next-round key when the second cryptographic mode is an Advanced Encryption Standard (AES) mode.

3. The apparatus of claim 1, wherein the first cryptographic mode uses an Advanced Encryption Standard (AES) algorithm, wherein the unified cipher datapath comprises eight Sboxes.

4. The apparatus of claim 3, wherein the second cryptographic mode uses a SMS4 algorithm, wherein the unified cipher datapath comprises eight Sboxes, and wherein the second block cipher is to use four of the eight Sboxes of the unified cipher datapath for round computation, and the other four Sboxes for key expansion.

5. The apparatus of claim 4, wherein the opcode is to specify a third cryptographic mode of the unified cipher datapath that uses a *Camellia* (CML) algorithm, wherein the unified cipher datapath comprises eight Sboxes.

6. The apparatus of claim 1, wherein the execution circuitry comprises a cipher accelerator including the unified cipher datapath, wherein the unified cipher datapath comprises eight Sboxes, each of which provides an Sbox output and a scaled Sbox output, wherein the first, the second, and a third cryptographic modes use Advanced Encryption Standard (AES), SMS4, and *Camellia* (CML) algorithms, respectively, and wherein the cipher accelerator is to balance a critical path delay across all three cryptographic modes by eliminating multiplication from the first cryptographic mode when performing scaling in the first block cipher, and instead adding the Sbox output and the scaled Sbox output to generate a required scaled output.

7. The apparatus of claim 1, wherein the execution circuitry comprises a cipher accelerator including the unified cipher datapath, wherein the first, the second, and a third cryptographic modes use Advanced Encryption Standard (AES), SMS4, and *Camellia* (CML) algorithms, respectively, and wherein the cipher accelerator is further to enable inversion sharing by translating operands from AES-specific, SMS4-specific, and CML-specific reduction polynomials to a unique, composite field.

8. The apparatus of claim 1, wherein the execution circuitry comprises a cipher accelerator including the unified cipher datapath, wherein the opcode is to specify a cryptographic mode of the unified cipher datapath that uses a *Camellia* (CML) algorithm, and wherein the cipher accelerator is further to include separate circuitry to perform two intra-Feistel CML shuffle functions (FL/FL-1).

9. The apparatus of claim 1, wherein the opcode is to indicate whether to encrypt or decrypt, and wherein the cipher instruction is further to specify a key length and a number of rounds, the key length being one of 128, 192, or 256 bits, and the number of rounds being one of 1, 10, 12, 14, 18, 24, or 32.

10. The apparatus of claim 1, wherein the apparatus is one of a processor, a processor core, a network processor, a mobile processor, or a web server.

11. A method performed by a computing apparatus, the method comprising:
fetching, using fetch circuitry, a cipher instruction specifying a datum, a key, and an opcode to specify a first cryptographic mode or a second cryptographic mode and an operation;
decoding, using decode circuitry, the fetched cipher instruction; and
executing, using execution circuitry, the decoded cipher instruction by:
in response to the opcode specifying the first cryptographic mode, configuring a unified cipher datapath to the first cryptographic mode for a first block cipher corresponding to the first cryptographic mode, and performing the operation using the unified cipher datapath configured in the first cryptographic mode, and
in response to the opcode specifying the second cryptographic mode, configuring the unified cipher datapath to the second cryptographic mode for a second block cipher corresponding to the second cryptographic mode and different than the first block cipher, and performing the operation using the unified cipher datapath configured in the second cryptographic mode, wherein the unified cipher datapath comprises a plurality of hybrid substitution boxes (Sboxes) to perform Galois Field (GF) multiplications and inverse computations.

12. The method of claim 11, wherein the execution circuitry comprises a cipher accelerator including the unified cipher datapath, wherein the unified cipher datapath comprises eight hybrid Sboxes, and wherein the cipher accelerator further comprises a 128-bit register to hold the specified datum, and two 128-bit registers, one of the two 128-bit registers to be used to hold the specified key, and the other 128-bit register to be used to hold an auxiliary key when the first cryptographic mode is a *Camellia* mode, and a next-round key when the second cryptographic mode is an Advanced Encryption Standard (AES) mode.

13. The method of claim 11, wherein the first cryptographic mode uses an Advanced Encryption Standard (AES) algorithm, wherein the unified cipher datapath comprises eight Sboxes.

14. The method of claim 13, wherein the second cryptographic mode uses a SMS4 algorithm, wherein the unified cipher datapath comprises eight Sboxes, and wherein the second block cipher is to use four of the eight Sboxes of the unified cipher datapath for round computation, and the other four Sboxes for key expansion.

15. The method of claim 14, wherein the opcode is to specify a third cryptographic mode of the unified cipher datapath that uses a *Camellia* (CML) algorithm, wherein the unified cipher datapath comprises eight Sboxes.

16. The method of claim 11, wherein the execution circuitry comprises a cipher accelerator including the unified cipher datapath, wherein the unified cipher datapath comprises eight Sboxes, each of which provides an Sbox output and a scaled Sbox output, wherein the first, the second, and a third cryptographic modes use Advanced Encryption Standard (AES), SMS4, and *Camellia* (CML) algorithms, respectively, and wherein the cipher accelerator balances a critical path delay across all three cryptographic modes by eliminating multiplication from the first cryptographic mode when performing scaling in the first block cipher, and instead adding the Sbox output and the scaled Sbox output to generate a required scaled output.

17. The method of claim 11, wherein the execution circuitry comprises a cipher accelerator including the unified cipher datapath, wherein the first, the second, and a third cryptographic modes use Advanced Encryption Standard (AES), SMS4, and *Camellia* (CML) algorithms, respectively, and wherein the cipher accelerator is further to enable inversion sharing by translating operands from AES-specific, SMS4-specific, and CML-specific reduction polynomials to a unique, composite field.

18. The method of claim 11, wherein the execution circuitry comprises a cipher accelerator including the unified cipher datapath, wherein the opcode is to specify a cryptographic mode of the unified cipher datapath that uses a *Camellia* (CML) algorithm, and wherein the cipher accelerator is further to include separate circuitry to perform two intra-Feistel CML shuffle functions (FL/FL-1).

19. The method of claim 11, wherein the opcode is to indicate whether to encrypt or decrypt, and wherein the cipher instruction is further to specify a key length and a number of rounds, the key length being one of 128, 192, or 256 bits, and the number of rounds being one of 1, 10, 12, 14, 18, 24, or 32.

20. The method of claim 11, wherein the computing apparatus is one of a processor, a processor core, a network processor, a mobile processor, or a web server.

21. A non-transitory machine-readable medium containing code, when executed by a processor, to cause the processor to perform a method comprising:
fetching, using fetch circuitry, a cipher instruction specifying a datum, a key, and an opcode to specify a first cryptographic mode or a second cryptographic mode and an operation;
decoding, using decode circuitry, the fetched cipher instruction; and
executing, using execution circuitry, the decoded cipher instruction by:
in response to the opcode specifying the first cryptographic mode, configuring a unified cipher datapath to the first cryptographic mode for a first block cipher corresponding to the first cryptographic mode, and performing the operation using the unified cipher datapath configured in the first cryptographic mode, and
in response to the opcode specifying the second cryptographic mode, configuring the unified cipher datapath to the second cryptographic mode for a second block cipher corresponding to the second cryptographic mode and different than the first block cipher, and performing the operation using the unified cipher datapath configured in the second cryptographic mode, wherein the unified cipher datapath comprises a plurality of hybrid substitution boxes (Sboxes) to perform Galois Field (GF) multiplications and inverse computations.

22. The non-transitory machine-readable medium of claim 21, wherein the execution circuitry comprises a cipher accelerator including the unified cipher datapath, wherein the unified cipher datapath comprises eight hybrid Sboxes, and wherein the cipher accelerator further comprises a 128-bit register to hold the specified datum, and two 128-bit registers, one of the two 128-bit registers to be used to hold the specified key, and the other 128-bit register to be used to hold an auxiliary key when the first cryptographic mode is a *Camellia* mode, and a next-round key when the second cryptographic mode is an Advanced Encryption Standard (AES) mode.

23. The non-transitory machine-readable medium of claim 21, wherein the first cryptographic mode uses an Advanced Encryption Standard (AES) algorithm, wherein the unified cipher datapath comprises eight Sboxes.

24. The non-transitory machine-readable medium of claim 23, wherein the second cryptographic mode uses a SMS4 algorithm, wherein the unified cipher datapath comprises eight Sboxes, and wherein the second block cipher is to use four of the eight Sboxes of the unified cipher datapath for round computation, and the other four Sboxes for key expansion.

25. The non-transitory machine-readable medium of claim 24, wherein the opcode is to specify a third cryptographic mode of the unified cipher datapath that uses a *Camellia* (CML) algorithm, wherein the unified cipher datapath comprises eight Sboxes.

\* \* \* \* \*